United States Patent [19]

Asakura et al.

[11] Patent Number: 4,887,096

[45] Date of Patent: Dec. 12, 1989

[54] RECORDING APPARATUS

[75] Inventors: Osamu Asakura, Tokyo; Yoshio Uchikata, Yokohama; Kenji Kawazoe, Kawasaki; Akihiko Sukigara, Tokyo; Yoshikazu Shibamiya, Tokyo; Shigeru Mizoguchi, Kawasaki, all of Japan

[73] Assignee: Canon Kabushiki Kaisha, Tokyo, Japan

[21] Appl. No.: 262,087

[22] Filed: Oct. 24, 1988

Related U.S. Application Data

[63] Continuation of Ser. No. 28,617, Mar. 20, 1987, abandoned.

[30] Foreign Application Priority Data

| | | | |
|---|---|---|---|
| Mar. 24, 1986 | [JP] | Japan | 61-65064 |
| Mar. 24, 1986 | [JP] | Japan | 61-65065 |
| Mar. 24, 1986 | [JP] | Japan | 61-65066 |
| Mar. 24, 1986 | [JP] | Japan | 61-65067 |
| Mar. 24, 1986 | [JP] | Japan | 61-65068 |
| Mar. 24, 1986 | [JP] | Japan | 61-65069 |
| Mar. 24, 1986 | [JP] | Japan | 61-65070 |

[51] Int. Cl.[4] .................... G01D 15/10

[52] U.S. Cl. .................... 346/76 PH; 400/120

[58] Field of Search .................... 346/76 PH; 400/120 PH

[56] References Cited

U.S. PATENT DOCUMENTS

| | | | |
|---|---|---|---|
| 1,950,762 | 3/1934 | Thompson | 197/157 |
| 3,974,906 | 8/1976 | Lee et al. | 197/168 |
| 4,280,767 | 7/1981 | Heath | 400/216.2 |
| 4,384,797 | 5/1983 | Anderson et al. | 400/696 |
| 4,407,593 | 10/1983 | Haftmann | 400/208 |
| 4,428,695 | 1/1984 | Jamieson | 400/249 |
| 4,545,693 | 10/1985 | Bartlett et al. | 400/120 |
| 4,572,687 | 2/1986 | Croley et al. | 400/696 |
| 4,672,393 | 6/1987 | Uchikata et al. | 346/76 PH |

FOREIGN PATENT DOCUMENTS

| | | |
|---|---|---|
| 56-69187 | 6/1981 | Japan . |
| 56-162682 | 12/1981 | Japan . |
| 60-73358 | 11/1985 | Japan . |
| 0137789 | 6/1986 | Japan . |
| 61-144377 | 7/1986 | Japan . |

OTHER PUBLICATIONS

"Materials for Thermal Transfer Printing, 1984 Int'l Printing & Graphics Arts/Testing Conference".

*Primary Examiner*—Goldberg E. A.
*Assistant Examiner*—Huan H. Tran
*Attorney, Agent, or Firm*—Fitzpatrick, Cella, Harper & Scinto

[57] ABSTRACT

A recording apparatus such as a printer for recording onto a recording medium by use of an ink sheet having an ink comprises: a thermal head to heat the ink sheet to thereby record onto the recording medium; a peeling device to peel off the ink sheet from the recording medium after the heating of the ink sheet by the thermal head on the basis of the recording information; and a controller to control the peeling condition of the peeling device on the basis of the recording information so as to initialize the peeling device at the time of the exchange of the ink sheet or the power-ON of the apparatus. With this apparatus, the high quality recording can be certainly performed by a desired color in response to the color information. This apparatus can mount either the uni-color ink ribbon or the two-color ink ribbon. The heating position of the thermal head is controlled so as to start the recording from the print start position in the first or second recordable area which is defined in accordance with the selected one of the uni-color and two-color ink ribbons.

19 Claims, 18 Drawing Sheets

RECORDING APPARATUS

This application is a continuation of application Ser. No. 028,617 filed Mar. 20, 1987, abandoned.

BACKGROUND OF THE INVENTION

1. Field of the Invention

The present invention relates to a printer which is used in a recording section of an output apparatus such as, e.g., electronic typewriter, facsimile apparatus, personal computer, or the like, or to a recording apparatus of a word processor or the like in which a color recording image corresponding to color information can be obtained by use of an ink sheet (e.g., ink ribbon) having an ink. The invention also incorporates not only the case where the color information denotes different colors but also the case where the color information represents the same color.

2. Related Background Art

Hitherto, in the recording apparatus which can obtain a recording image of the color corresponding to the color information, a wide ink ribbon on which ink layers of different colors are coated in the width direction is used, and by vertically moving the ink ribbon in accordance with the color to be recorded, the ink layer of a desired color must be led to the recording section.

Therefore, the foregoing conventional apparatus needs the means for vertically moving the ink ribbon, so that there are problems such that the apparatus increases in size and is complicated. On the other hand, in the case where different colors are provided in the feeding direction of the ink ribbon, the similar problems are also caused with respect to the feeding operation of the ribbon and the like.

To solve such problems, the applicant of the present invention has already proposed the following technique as disclosed in Japanese Patent Application No. 260403/1984.

Namely, in order to record a plurality of clear colors onto a medium to be recorded (hereinafter, referred to as a recording medium), the first and second ink layers, having different color tones, in that order are formed on a support member. After thermal energy is applied from the support member side, the time period after such application and before the support member is peeled off is changed, thereby leaving one or both of the ink layers behind and forming a recording image of the selected color onto the recording medium.

The present applicant has further clarified the following technique as shown in Japanese Patent Application No. 298831/1985.

Namely, at least two ink layers consisting of the first and second ink layers are formed on a support member. An ink sheet having an adhesive layer at least either in the portion between the first and second ink layers or in the portion between the first ink layer and the support member comes into contact with a recording medium. The thermal energy is applied to the ink sheet in accordance with the recording information. Thereafter, the peeling time after the thermal energy was applied until the ink sheet is peeled off from the recording medium is controlled, thereby transferring a predetermined ink layer onto the recording medium. In this manner, a recording image of the selected color is formed onto the recording medium.

SUMMARY OF THE INVENTION

In consideration of the foregoing points, it is an object of the present invention to provide a recording apparatus in which the color corresponding to color information of a recording medium can be recorded by a single ink sheet at the same position.

In consideration of the foregoing points, another object of the invention is to initialize the operation of means for peeling off an ink sheet from a recording medium when a power supply to an apparatus is turned on.

In consideration of the foregoing points, still another object of the invention is to control peeling condition such as relative movement amount, relative moving velocity, or the like between an ink sheet and a recording medium in accordance with color information.

In consideration of the foregoing points, still another object of the invention is to control the peeling condition between an ink sheet and a recording medium and further to control the position of an index section for instructing a recording position.

In consideration of the foregoing points, still another object of the invention is to pull in slack of an ink sheet in response to the turn-on of a power supply, the exchange of the ink sheet, and the change of a recording color.

In consideration of the foregoing points, still another object of the invention is that the first ink sheet which can record in uni-color and the second ink sheet which can record in two or more colors can be provided, it is discriminated whether the first or second ink sheet has been set, the first recording range or the second recording range is set in response to the result of the discrimination, and the heating position of heating means is controlled in a manner such that when the ink sheet is exchanged, the recording can be performed from record start position in the first or second recording range.

In consideration of the foregoing points, still another object of the invention is to control the thermal energy for recording and the movement amount of a member for peeling off an ink sheet from a recording medium on the basis of information concerned with the recording.

In summary, the present invention is a recording apparatus including a thermal head to heat the ink sheet to thereby record onto the recording medium, a peeling device to peel off the ink sheet from the recording medium after the heating of the ink sheet by the thermal head on the basis of the recording information and a controller to control the peeling condition of the peeling device on the basis of the recording information so as to initialize the peeling device at the time of the exchange of the ink sheet or the power - ON of the apparatus.

DETAILED DESCRIPTION OF THE PREFERRED EMBODIMENTS

An embodiment of the present invention will be described hereinbelow with reference to the drawings.

In the following embodiment, the case of two-color recording will be explained for simplicity of explanation. However, the invention is not limited to only this case. For example, the color tones of the first and second ink layers may be set to the same color tone, or it is also possible to perform the recording to three or more colors by further adding another ink layer of a different color tone. When the color tones of the first and second ink layers are set to be equal, the ink sheet can be used for the double period of time in the uni-color recording mode.

An ink sheet for use in the embodiment will be first described. As an ink sheet which is used in the embodiment, it is possible to use the ink sheet which has been clearly shown in the foregoing Japanese Patent Application Nos. 260403/1984 or 298831/1985.

Figure 1:
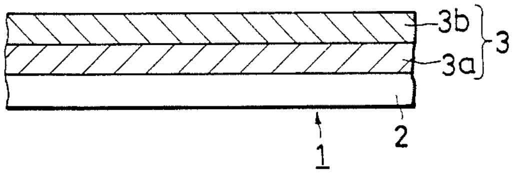
FIGS. 1 and 2 are cross sectional views in the direction of thickness of an ink ribbon which can be applied to embodiments of the present invention.

FIG. 1 is a cross sectional view of an ink ribbon 1 which can be applied to the invention.

Namely, as shown in FIG. 1, the ink ribbon 1 is constituted by forming a thermal transfer ink layer 3 on a sheet-shaped support member 2.

The ink layer 3 itself has a multilayer structure consisting of a first ink layer 3*a* and a second ink layer 3*b* which are disposed in accordance with this order from the side of the support member 2.

A conventionally well-known film or paper may be directly used as the support member 2. For example, it is possible to preferably use a plastic film having the relatively good heat resistance such as polyester, polycarbonate, triacetyl, cellulose, nylon, polyimide, or the like, cellophane, parchment paper, condenser paper, or the like. In the case of considering a thermal head as a thermal source upon thermal transfer, it is desirable to set a thickness of support member 2 to be about 1 to 15 μm. However, the thickness of support member 2 is not particularly limited in the case of using a thermal source such as e.g., a laser beam or the like which can selectively heat the thermal transfer ink layer.

When a thermal energy is applied, it is necessary that the first ink layer 3*a* can be easily peeled off from the second ink layer 3*b*. In addition, for the first ink layer 3*a*, the following conditions need to be satisfied. When the time period after the thermal energy was applied until the support member 2 is peeled off from the recording medium is long, in other words, when the ink ribbon 1 is adhered to the recording medium so as to face each other and the adhered thermal head runs after the thermal energy was applied and the ink ribbon 1 is fairly cooled, the first ink layer 3*a* can be easily peeled off from the support member 2.

Therefore, as a thermal fusing binder, it is preferable that the following conditions are satisfied. Namely, the thermal fusing binder contains at least 50% or more of natural wax such as whale wax, bees wax, lanolin, carnauba wax, candelilla wax, montan wax, ceresin wax, or the like, petroleum wax such as paraffin wax, microcrystalline wax, or the like, synthetic wax such as oxide wax, ester wax, low molecular amount polyethylene, Fischer-Tropsh wax, or the like, higher fatty acid such as lauric acid, myristic acid, palmitic acid, stearin acid, behenic acid, or the like, higher alcohol such as stearyl alcohol, behenyl alcohol, or the like, ester group such as fatty acid ester of cane sugar, fatty acid ester of sorbitan, or the like, or amide group such as oleylamide or the like. Further, this binder contains a proper amount of elastomer group such as polyolefine system resin, polyamide system resin, polyester system resin, epoxy system resin, polyurethane system resin, polyacrylic system resin, polyvinyl chloride system resin, cellulosic system resin, polyvinyl alcohol system resin, petroleum system resin, phenol system resin, polystrrene system resin, acetic vinyl system resin, natural rubber, suretine butadiene rubber, isoprene rubber, chloroprene rubber, or the like, polyisobutylene, polybutene, plasticizer, or oil agent such as mineral oil, vegetable oil, or the like. A melting temperature of the binder as an ink layer which also contains a coloring agent and an addition agent is preferably set to a value within a range of 50° to 150° C. It is desirable that a melt viscosity (rotational viscometer) at 150° C. is 500 CPS.

The fusing temperature used in this example is obtained as an outflow start temperature when a curve indicative of the apparent viscosity to temperature characteristic of a sample ink is obtained using the Shimazu flow tester, model CFT 500, under the conditions of a load of 10 kg and a temperature increasing rate of 2° C./minute.

For the second ink layer 3*b*, it is necessary that when a thermal energy is applied from the thermal head, the ink of the second ink layer is fused and softened and certainly fixedly adhered onto the recording medium and that when the second ink layer 3*b* is in the fused state, it is hard to be mixed with the first ink layer 3*a*. As a thermal fusing binder suitable for the second ink layer 3*b*, it is preferable to use a binder containing at least 50 weight percent or more of the foregoing resin and a proper amount of oil agent such as wax group, plasticizer, mineral oil, vegetable oil, or the like, and it is desirable that a melting temperature of the ink layer falls within a range of 60° to 150° C. and a melt viscosity (rotational viscometer) lies within a range of 200 to 1,000,000 CPS. On the other hand, in order to improve the printing quality of the second ink layer 3*b*, the second ink layer 3*b* may be formed like a dot shape or the surface of the second ink layer 3*b* may be also roughly formed.

It is desirable that the thickness of the first ink layer 3*a* falls within a range of 0.5 to 10 μm and that the whole thickness of the thermal transfer ink layer 3 lies within a range of 2 to 20 μm.

On the other hand, in the case of making the color tones of the first and second ink layers 3*a* and 3*b* different, it is desirable that the color tone of the first ink layer 3*a* is set to dark color such as black or the like and that the color tone of the second ink layer 3*b* is set to bright color such as yellow or the like. To obtain the mixed color of the color tones of the first and second ink layers 3*a* and 3*b*, for example, by setting the color tone of the first ink layer 3*a* to yellow and by setting the color tone of the second ink layer 3*b* to magenta, magenta and red can be derived. Further, by changing the dye concentration of each layer or by changing the ratio of the thicknesses of layers, the recording of two various different colors can be performed.

As a coloring agent, various kinds of dyes which are widely used in the printing and recording fields may be used. It is proper that the containing amount of coloring agent falls within a range of 1 to 80% with respect to each of the ink layers 3*a* and 3*b*. On the other hand, an addition agent such as dispersing agent or filler material consisting of metal fine powder, inorganic fine powder, metal oxide, or the like may be also further properly added to the ink layers 3*a* and 3*b* as necessary, respectively.

It is desirable to select materials having no compatibility as the first and second ink layers 3*a* and 3*b*. However, even if materials having compatibility are used, they can be peeled off from each other owing to the difference between their melt viscosities.

The ink ribbon which is used in the embodiment is obtained in the following manner. The foregoing thermal fusing binder, coloring agent, and addition agent are fused and kneaded into each of the ink layers 3*a* and 3*b* by use of a dispersing apparatus such as an attritor or the like or kneaded together with proper solvents, thereby obtaining thermal fusing inks or inks like solutions or dispersive liquids. These inks are sequentially coated onto the support member and are dried as necessary. In this manner, the first and second ink layers are formed in accordance with this order.

Figure 2:
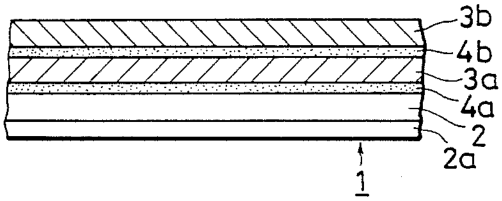

FIG. 2 shows another embodiment of the ink ribbon 1.

The ink ribbon 1 shown in FIG. 2 is constituted by sequentially forming a first adhesive layer 4*a*, the first ink layer 3*a*, a second adhesive layer 4*b*, and the second ink layer 3*b* on the support member 2.

Figure 3A:
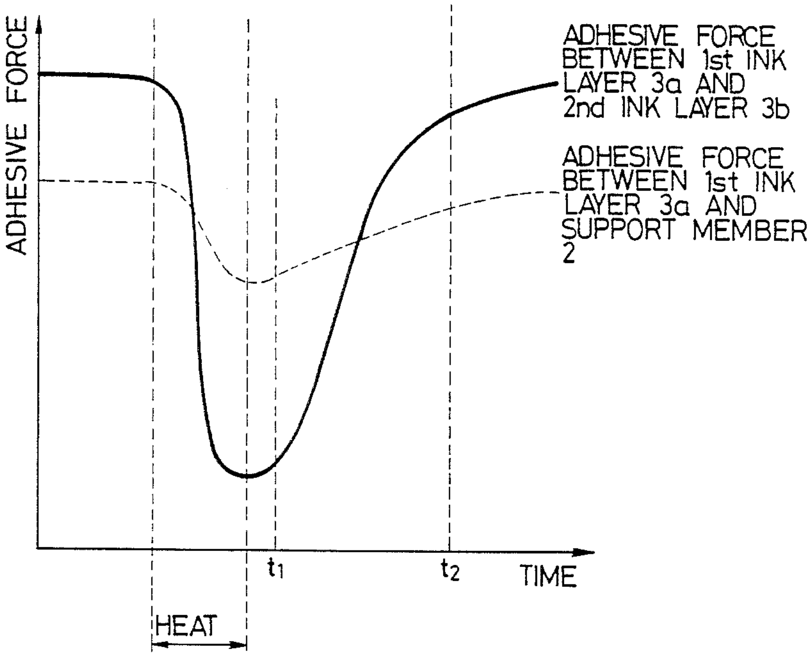
FIGS. 3A and 3B are graphs showing the relation between the elapsed time and the change in adhesive force between respective layers.

In the case of the ink ribbon 1 shown in FIG. 2, the relation between the adhesive force between the support member 2 and the first ink layer 3*a* and the adhesive force between the first ink layer 3*a* and the second ink layer 3*b* is also substantially equal to that in the case of the ink ribbon shown in FIG. 1. Namely, when a layer whose adhesive force largely changes in dependence on the temperature is used as the second adhesive layer 4*b*, the temperature of the second adhesive layer 4*b* increases by heating the thermal head and at the same time, the strength of the second adhesive layer 4*b* rapidly decreases, so that the adhesive forces between the respective layers change as shown in FIG. 3A.

Figure 3B:
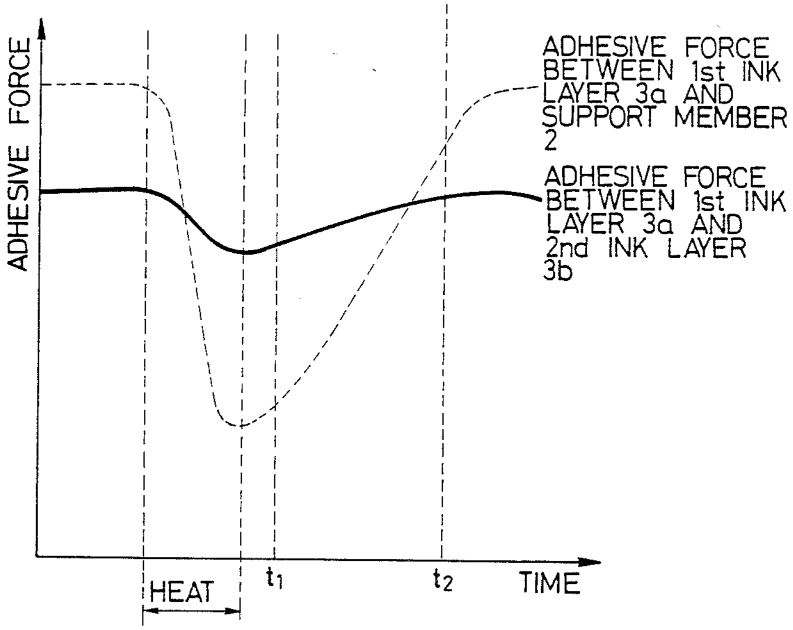

On the other hand, when a layer whose adhesive force largely varies depending on the temperature is used as the first adhesive layer 4*a* and a layer whole adhesive force relatively slightly changes by the temperature is used as the second adhesive layer 4*b*, the adhesive forces between the respective layers change as shown in FIG. 3B.

A heat resistance protection layer 2*a* is formed on the surface of the support member 2 which comes into contact with the thermal head. This protection layer is made of silicone resin, fluororesin, polyimide resin, melamine resin, nitrocellulose, or the like. The protection layer 2*a* can improve the heat resistance of the support member 2, or a support member material which could not be used hitherto an be also used.

The recording apparatus which can obtain a recording image of the color corresponding to color information by use of the foregoing ink ribbon will now be described with respect to an electronic typewriter as an example.

According to the following embodiment, the two-color recording can be performed by properly providing the cases where a thermal energy is applied to an ink sheet and thereafter, the ink sheet is peeled off from the recording medium in a short time and where a cooling period of time of the ink sheet is provided after the thermal energy was applied and the ink sheet is then peeled off from the recording medium.

Figure 4:
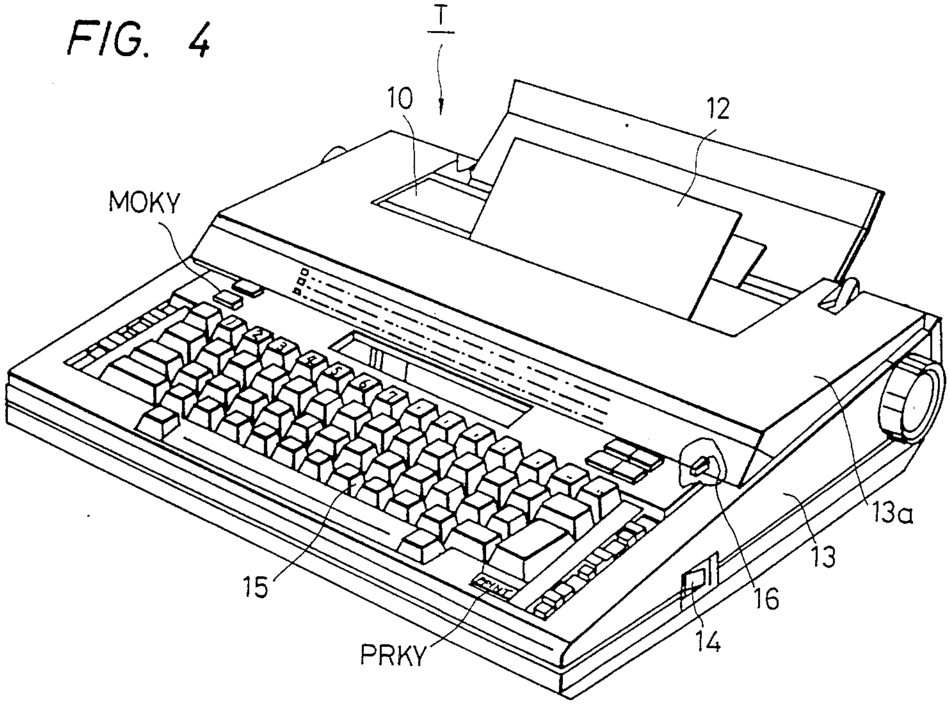
FIG. 4 is an external perspective view of a typewriter to which an embodiment of the invention is applied.

FIG. 4 shows an external perspective view of a typewriter T as an output apparatus to which an embodiment of the present invention is applied.

In the diagram, reference numeral 10 denotes a platen; 12 is a recording paper; 13 an outer casing; 14 a power switch to turn on or off a power supply; 15 a keyboard; and 16 a hood switch which is turned on or off in response to the opening or closure of a hood 13*a*. The hood switch 16 detects the opening or closure of the hood 13*a* and when the hood 13*a* is opened, the hood switch 16 generates a signal to shift an ink ribbon, which will be explained hereinafter, to a predetermined position and to lock the keyboard. MOKY represents a mode key 1 to set various kinds of operating modes such as ribbon-mode set and the like. PRKY indicates a print command key. The typewriter T includes therein a printing section, an input section, a display section, a control section, an external input/output interface section, and the like. In this embodiment, the input section and display section are not necessarily provided.

Figure 5:
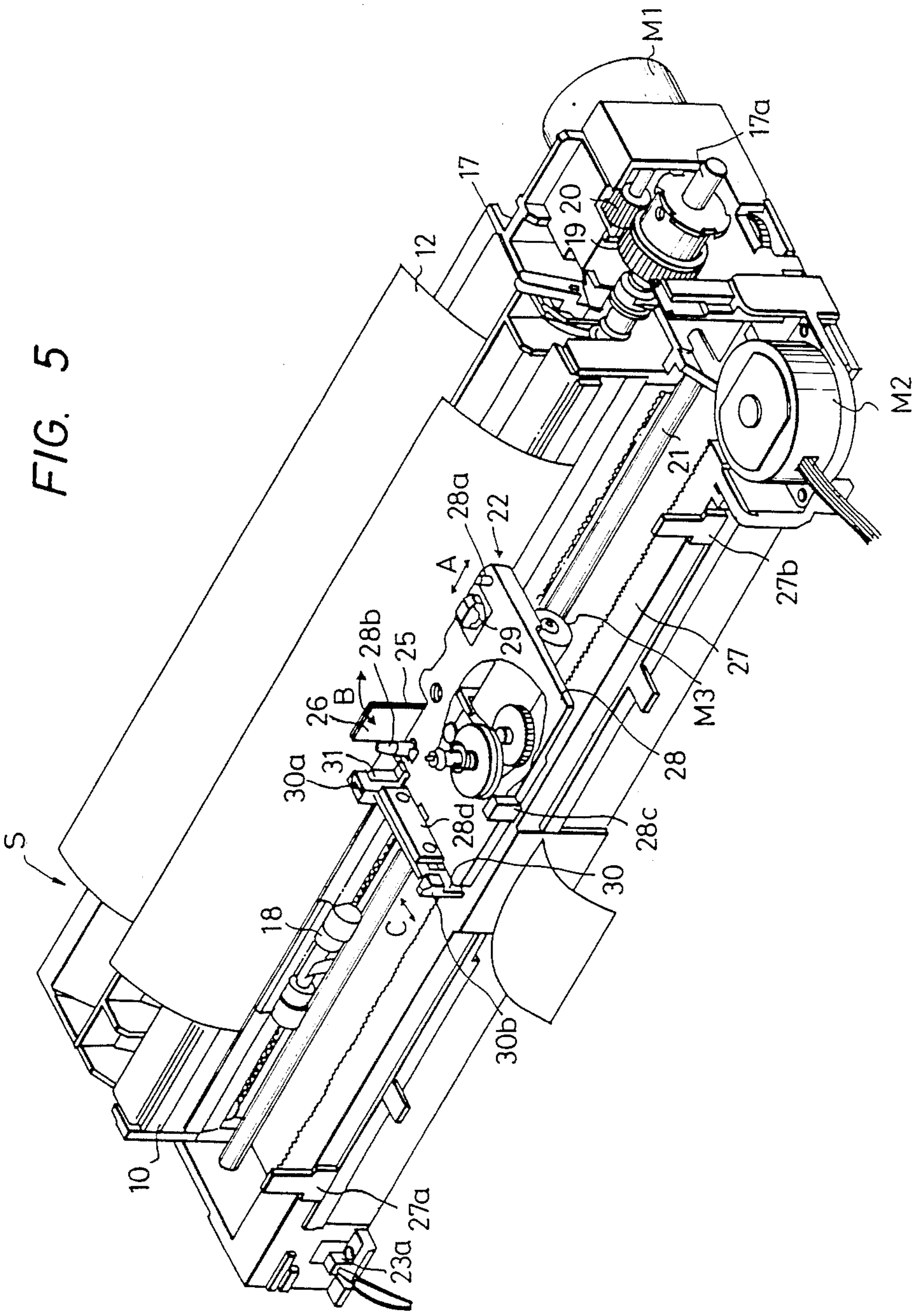
FIGS. 5 and 6 are perspective views of a recording section to which an embodiment of the invention is applied.
Figure 6:
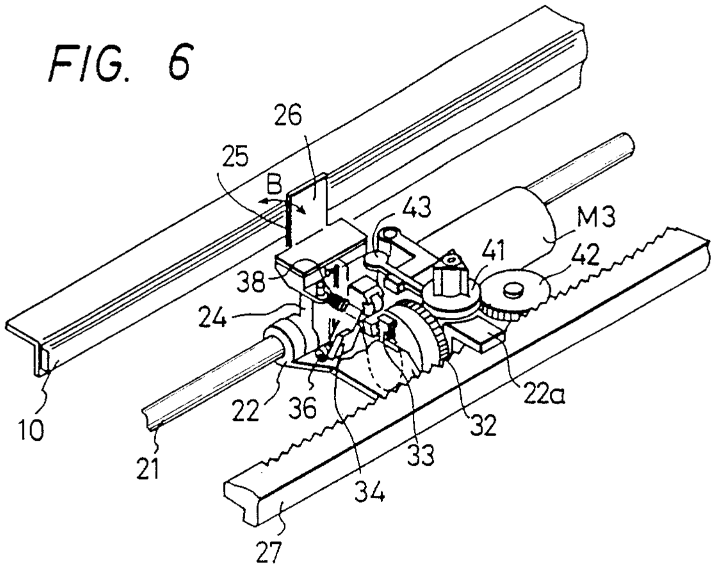

FIGS. 5 and 6 are perspective views of the recording section to which the embodiment of the invention is applied.

The recording paper 12 is wound around the platen 10 and in this state, the paper comes into pressure contact with a rubber portion (not shown) of a paper feed roller 17 by a pinch roller 18. A gear 19 is attached to a shaft 17*a* of the paper feed roller 17. The shaft 17*a* is connected to a paper feed motor $M_1$. through a reduction gear 20. When the paper feed motor $M_1$ rotates, the paper feed roller 17 rotates to thereby feed the recording paper 12. Therefore, when a thermal head 25, which will be explained hereinafter, comes into contact with the recording paper 12 and performs the recording, the platen 10 maintains the position of the recording paper 12.

The reciprocating movement of a carrier 22 will now be described.

A shaft 21 is disposed in front of the platen 10 in parallel therewith. The carrier 22 (FIG. 6) is guided and supported by the shaft 21 so as to be movable in the directions of arrows A. Namely, the carrier 22 can be reciprocated along a conveying path S of the recording paper 12.

A part of a belt 23 is fixed to the carrier 22 and suspended by two pulleys (not shown). A carrier motor $M_2$ is connected to these pulleys (not shown) through gears (not shown). When the carrier motor $M_2$ rotates, the pulleys (not shown) rotate and the belt 23 is moved, so that the carrier 22 is reciprocated (in the directions of the arrows A) along the shaft 21. On the other hand, a limit sensor 23a to detect the position of the carrier 22 is attached to the edge portion on the side of the home position.

Further, a head holder 24 (FIG. 6) is guided and supported by the carrier 22 so as to be rotatable around the shaft 21. The thermal head 25 is attached to a heat sink 26. The heat sink 26 is attached to the head holder 24. The carrier 22 is guided and supported by a rack 27 by a guide portion 22a which is formed integrally with the carrier 22. Projecting portions 27a and 27b are formed at both ends of the rack 27.

Figure 11:
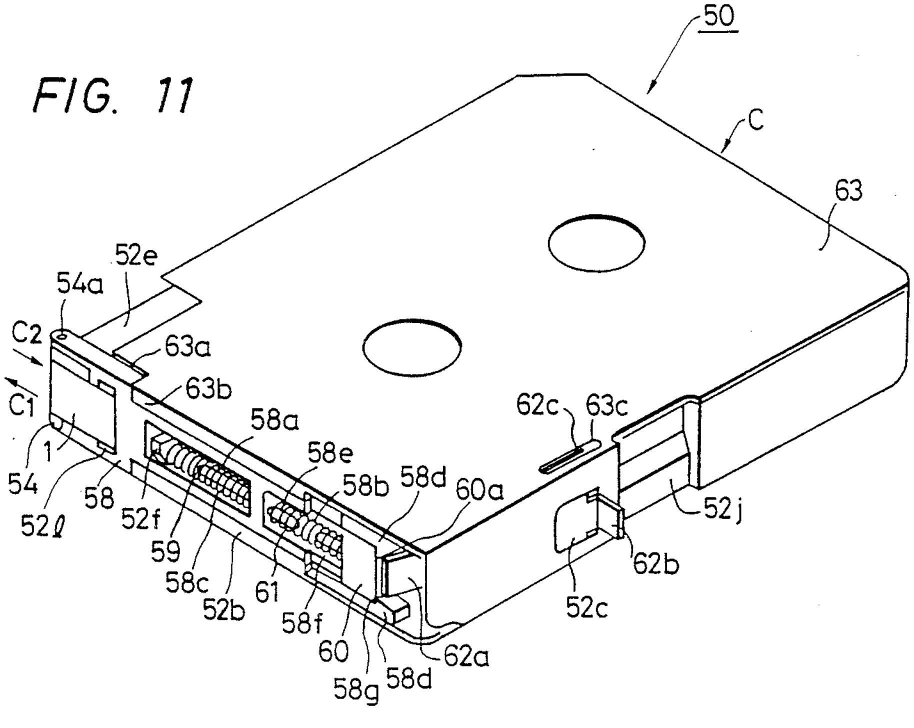
FIG. 11 is an external perspective view of a two-color ribbon cassette.

The carrier 22 is further provided with a carrier table 28 to mount an ink ribbon cassette 50 (FIG. 11). A sensor 29 is attached to the table 28 in order to detect the presence or absence and the kind of the ink ribbon cassette 50 and to detect the end of the ink ribbon 1. Moreover, a coupling lever 30 is guided and supported by the carrier table 28 so as to be movable along the guide portion 22a in the direction (direction indicated by an arrow C) of the platen 10. The lever 30 is further come into engagement with a coupling member 31 attached to the heat sink 26. When the heat sink 26 rotates in the direction (indicated by an arrow B) of the platen 10, the lever 30 moves in such a direction (indicated by the arrow C) as to approach or be away from the platen 10. An index portion 30a is attached to the coupling lever 30. The position to be printed next can be confirmed by sight using the index portion 30a. On the other hand, an engaging portion 30b is attached to the rear end of the lever 30. When a change-over lever 62 of the cassette 50, which will be explained hereinafter, is come into engagement with the engaging portion 30b, the lever 62 is pushed up toward the platen 10.

As described above, in the embodiment, the index portion 30a is provided for the coupling lever 30 which is adapted to approach the thermal head 25 and which is concerned with the control of the peeling condition. Therefore, when the recording is performed at the position indicated by the index portion 30a, it is sufficient to move the thermal head by only a short distance until the position indicated by the index portion 30a. Thus, in spite of the fact the index is provided, the recording speed is not reduced and the problems of noise and the like do not occur.

The case where the cassette 50 is detachably mounted onto the carrier table 28 will now be described. Pins 28a and 28b are fixed on the upper surface of the carrier table 28. An elastic hook portion 28c is formed on the side surface of the carrier table 28. The pins 28a and 28b are inserted into openings 52h and 52i formed in a lower cassette casing 52 of the cassette 50 (FIG. 12), which will be explained hereinafter. The hook portion 28c is elastically comea into engagement with a retaining portion 52j of the lower cassette casing 52. In this way, the cassette 50 can be detachably mounted onto the carrier table 28. Not only the two-color ribbon cassette but also an ordinary uni-color ribbon cassette can be also obviously commonly mounted onto the carrier table 28.

The up/down mechanism of the thermal head 25 will now be described.

FIGS. 7, 8, 9, and 10 are diagrams showing embodiments of a pressure contacting (down)/removing (up) mechanism of the head 25 and a ribbon take-up mechanism.

The up/down motor $M_3$ is attached to the carrier 22. The driving force of the up/down motor $M_3$ is transferred to a gear portion 32a of a cam 32 through a gear portion (not shown) and a reduction gear 31, thereby rotating the cam 32. The cam 32 is provided with a cam projecting portion 32b. When the cam 32 rotates clockwise (direction indicated by an arrow $D_1$ in FIG. 9) or counterclockwise (direction indicated by an arrow $D_2$ in FIG. 10), the cam projecting portion 32b comes into contact with a stopper 33 attached to the carrier 22, thereby restricting the rotation of the cam 32. The stopper 33 is formed of an elastic material such as rubber or the like and also serves to soften the contact with the cam 32.

Figure 10:
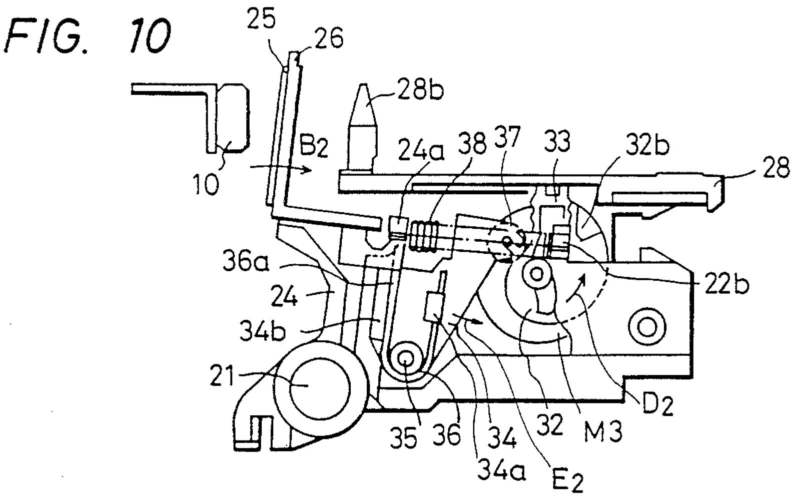

An up/down lever 34 is disposed over the carrier 22 so as to be rotatable around a shaft 35 (FIG. 10). A torsion coil spring 36 is attached between projecting portions 34a and 34b (FIG. 10) of the up/down lever 34 in the state in which the spring force is charged. A roller 37 is rotatably guided and supported at one end of the up/down lever 34. Further, a head return spring 38 is attached between a spring hook portion 24a of the head holder 24 and a spring hook portion 22b of the carrier 22, thereby pressing the head holder 24 so as to be away from the platen 10 (in the direction indicated by an arrow $B_2$ in FIGS. 8 and 10). The pressing force of the head return spring 38 is transferred from a pressure contact portion 24b of the head holder 24 to an arm portion 36a of the torsion coil spring 36 and is further transferred from the arm portion 36a to the up/down lever 34. Therefore, the lever 34 is pressed so as to be away from the platen 10 (in the direction indicated by an arrow $E_2$ in FIG. 10) by the head return spring 38. The roller 37 attached to the lever 34 is come into pressure contact with the cam 32.

Therefore, the thermal head 25 rotates toward the platen 10 when the motor $M_3$ rotates.

The take-up mechanism of the ink ribbon 1 will now be explained.

A take-up shaft 39 is attached to the carrier 22. Further, a take-up lever 40 is rotatably supported around the take-up shaft 39. A take-up clutch 41 is also rotatably supported over the take-up lever 40. A take-up gear 42 is rotatably supported to the lever 40. A gear portion (not shown) of the take-up clutch 41 is the sun gear. The take-up gear 42 is the planet gear.

Figure 7:
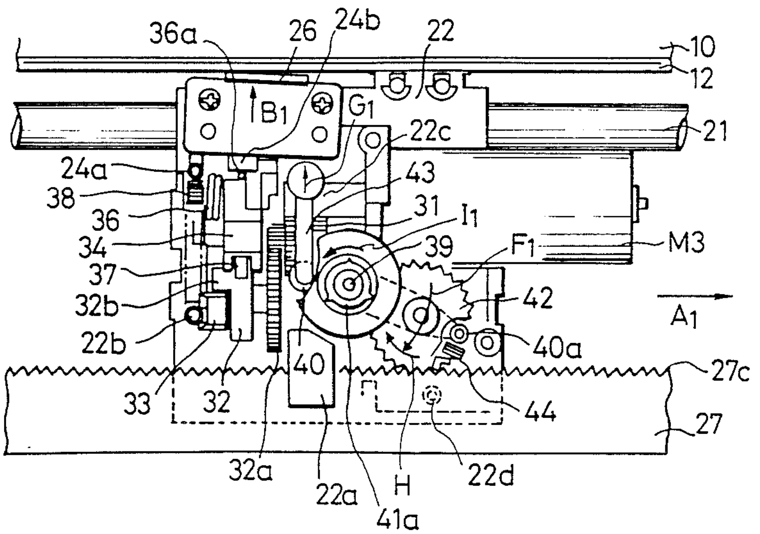
FIGS. 7 and 8 are plan views showing a head rotating mechanism and a ribbon take-up mechanism.
Figure 8:
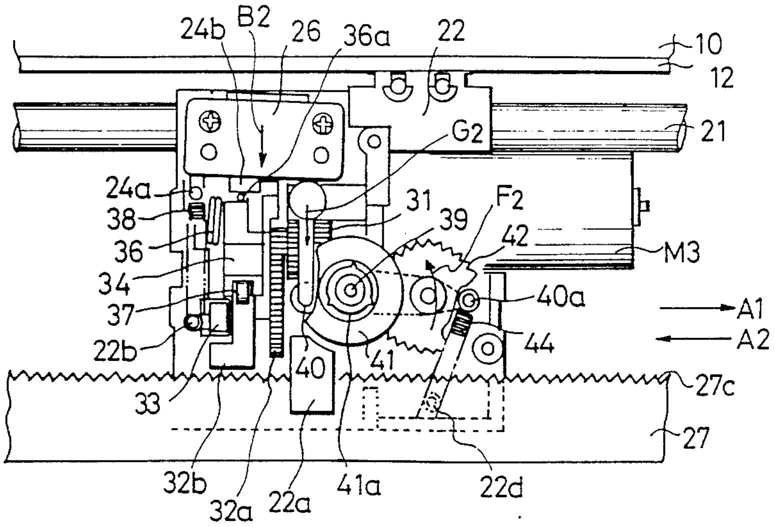

A take-up change-over lever 43 is attached to a guide portion 22c of the carrier 22 so as to be movable in the directions indicated by an arrow $G_1$ (FIG. 7) and an arrow $G_2$ (FIG. 8). One end of the lever 43 comes into engagement with the take-up lever 40. A take-up lever pressure contact spring 44 is further attached between a spring hook portion 40a of the take-up lever 40 and a spring hook portion 22d of the carrier 22, thereby pressing the lever 40 in the direction indicated by an arrow $F_1$ (FIG. 7). The pressing force of the spring 44 is transferred to the take-up change-over lever 43 through the take-up lever 40, thereby pressing the lever 43 in the direction of the arrow $G_1$ (FIG. 7) so as to come into pressure contact with the heat sink 26. A hub-receiving portion 41*a* is provided for the take-up clutch 41, thereby enabling the take-up hub to be inserted into the ink ribbon 1. On the other hand, a frictional clutch (not shown) is arranged between the hub receiving portion 41*a* of the take-up clutch 41 and a gear portion (not shown), thereby allowing the rotation of the gear portion (not shown) to be transferred to the hub receiving portion 41*a*.

The pressure contact (down) and removal (up) operations of the head and the ribbon take-up operation in the foregoing constitution will now be explained.

Figure 9:
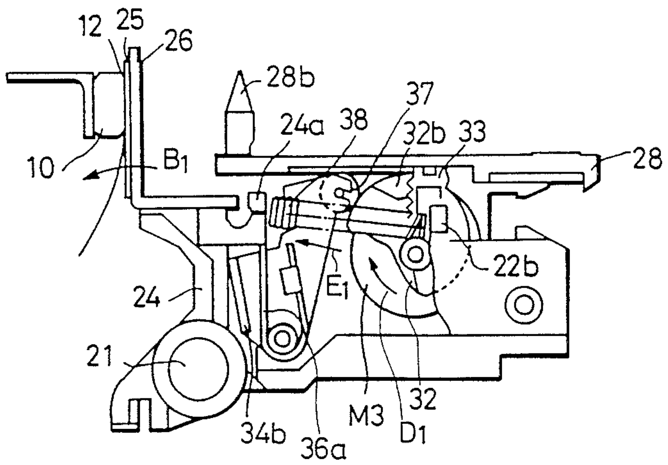
FIGS. 9 and 10 are side elevational views of FIGS. 7 and 8.

FIGS. 7 to 9 are diagrams showing the pressure contact (down) state of the head and illustrate the state in which the ribbon can be rewound. When the up/-down motor $M_3$ is rotated clockwise, the cam 32 is rotated in the direction of the arrow $D_1$ (FIG. 9) through the reduction gear 31, thereby allowing the cam projecting portion 32*b* of the cam 32 to come into contact with the stopper 33.

In association with the clockwise rotation (in the direction of the arrow $D_1$ in FIG. 9) of the cam 32, the radius of the cam 32 increases at the contact point between the cam 32 and the roller 37 attached to the up/down lever 34. Thus, the lever 34 rotates counterclockwise (in the direction of an arrow $E_1$ in FIG. 9) against the pressing force of the head return spring 38. The rotating force of the lever 34 is transferred to the pressure contact portion 24*b* of the head holder 24 from the arm portion 36*a* of the torsion coil spring 36 attached to the up/down lever 34, thereby rotating the head holder 24 counterclockwise (in the direction of the arrow $B_1$ in FIG. 9). Thus, the thermal head 25 attached to the heat sink 26 attached to the head holder 24 comes into pressure contact with the platen 10 through the recording paper 12. Namely, upon recording by the head 25, the head 25 comes into contact with the recording paper 12 and the position of the recording paper 12 is maintained by the platen 10.

After the thermal head 25 has come into contact with the platen 10, the radius of the cam 32 increases to thereby further rotate the up/down lever 34 counterclockwise (in the direction of the arrow $E_1$ in FIG. 9). In this state, since the thermal head 25 is in contact with the platen 10, the operation of the head holder 24 is restricted. Therefore, the operation of the arm portion 36*a* of the spring 36 which is in contact with the pressure contact portion 24*b* of the head holder 24 is also restricted. In association with the counterclockwise rotation (in the direction of the arrow $E_1$ in FIG. 9) of the up/down lever 34, the torsion coil spring 36 is away from the projecting portion 34*b* of the lever 34 and the spring force of the spring 36 is further charged. Since the projecting portion 34*b* of the lever 34 was removed from the arm portion 36*a* of the spring 36, the spring force of the spring 36 is transferred to the pressure contact portion 24*b* of the head holder 24, thereby pressing the thermal head 25 onto the platen 10 through the recording paper 12.

When the projecting portion 32*b* of the cam 32 in FIG. 9 is in contact with the stopper 33, the thermal head 25 is pressed to the platen 10 with a predetermined force.

The ribbon take-up mechanism to rewind the ink ribbon 1 will now be described.

When the heat sink 26 attached to the head holder 24 approaches the platen 10 (in the direction of the arrow $B_1$ in FIG. 7), the lever 43 is moved in the direction of the arrow $G_1$ (FIG. 7) by the force of the spring 44. Therefore, the take-up lever 40 rotates in the direction of the arrow $F_1$, so that the take-up gear 42 attached to the take-up lever 40 is come into engagement with a tooth portion 27*c* formed on the rack 27. When the thermal head 25 is in pressure contact with the platen 10, the operation of the lever 40 is restricted by contact position of the take-up gear 42 and rack 27. The gear 42 is pressed to the rack 27 by the spring 44. When the carrier 22 moves in the recording direction (indicated by the arrow $A_1$), the take-up gear 42 rotates clockwise (in the direction of an arrow $H_1$). Thus, the rotation of the gear 42 is transferred to the clutch 41 and the hub receiving portion 41*a* rotates counterclockwise (in the direction of an arrow $I_1$).

When the cassette 50 is mounted onto the carrier table 28, if a take-up hub 55 (FIGS. 12 and 13) provided on the side of the cassette 50 is inserted into the hub receiving portion 41*a*, the ink ribbon 1 in the cassette 50 can be rewound.

The removal (up) operation of the head 25 from the platen 10 will now be described. FIGS. 8 and 10 are diagrams showing the head removal (up) state and illustrate the state in which the ribbon rewinding operation is stopped.

When the up/down motor $M_3$ is rotated counterclockwise (in the direction opposite to the above), the cam 32 is rotated in the direction of the arrow $D_2$ (FIG. 10) through the reduction gear 31, thereby allowing the cam projecting portion 32*b* of the cam 32 to come into contact with the stopper 33. In association with the rotation of the cam 32 in the direction of the arrow $D_2$ (FIG. 10), the radius of the cam 32 at the contact point between the cam 32 and the roller 37 attached to the up/down lever 34 decreases. Therefore, the lever 34 rotates in the direction of the arrow $E_2$ (FIG. 10) by the pressing force of the head return spring 38. The head holder 24 is moved in the direction of the arrow $B_2$. The heat sink 26 and thermal head 25 attached to the head holder 24 are removed from the platen 10. When the heat sink 26 is moved in the direction of the arrow $B_2$, the take-up change-over lever 43 moves in the direction of the arrow $G_2$. Therefore, the lever 43 rotates the take-up lever 40 in the direction of an arrow $F_2$ against the pressing force of the spring 44, thereby allowing the take-up gear 42 to be removed from the rack 27.

When the head 25 is removed from the platen 10, i.e., in the non-recording mode, even if the carrier 22 is moved along the shaft 21 in the directions of the arrows $A_1$ and $A_2$, the hub receiving portion 41*a* of the clutch 41 does not rotate and no ink ribbon 1 is rewound. Therefore, even when the change-over lever 62 and a peeling roller 54 are away from the platen 10 in association with the head 25 as will be explained hereinafter, the ink ribbon 1 is not rewound.

Although the pressing force of the head return spring 38 is not large enough to charge the torsion coil spring 36, it is set so as to have a force adapted to overcome the force of the take-up lever pressure contact spring 44. The positions of the thermal head 25 and take-up gear 42 are fixed by the radius of the cam 32.

The up/down motor $M_3$ may be driven for a period of time enough to rotate the cam 32 or may be stopped by detecting a lock current of the up/down motor $M_3$ in response to the contact of the cam projecting portion 32*b* with the stopper 33. In this embodiment, the up/-down motor $M_3$ can be driven or stopped by providing a sensor (not shown) to detect the position of the cam 32.

The removal (up) of the head 25 or the removal (up) of the change-over lever or peeling roller in association with the head 25 from the platen 10 is executed in the case where the carrier 22 is returned to the home position, where a gap (i.e., what is called a skip) larger than a predetermined interval exists between images to be recorded, where a partial recording is performed, or the like. Since the ink ribbon is not rewound in such a case, it is possible to prevent unnecessary consumption of the ink sheet.

Figure 12:
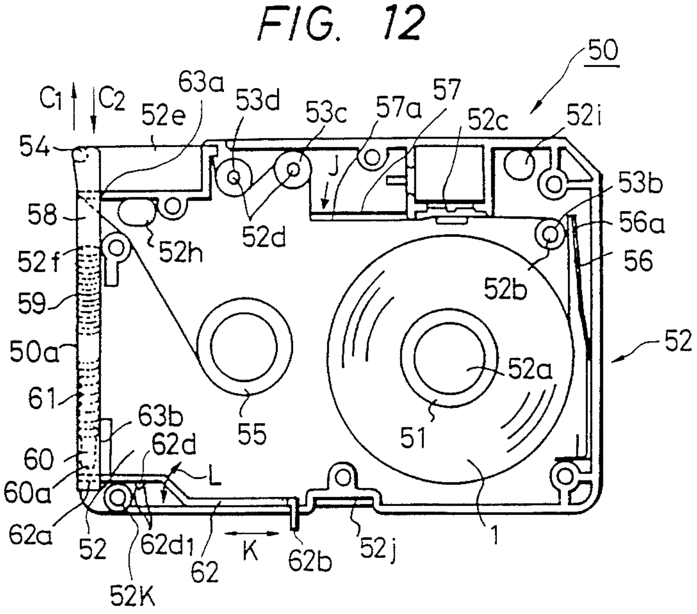
FIG. 12 is an external plan view of the ribbon cassette of FIG. 11.

The ink ribbon cassette will now be explained with reference to FIGS. 11 and 12.

Reference numeral 50 denotes the foregoing ink ribbon cassette. The ink ribbon 1 is enclosed into a casing C formed by the lower casing 52 and an upper casing 63. In this state, the cassette 50 is detachably mounted onto the carrier table 28.

In the diagrams, the ink ribbon 1 is wound around a core 51. A projecting portion 52*a* of the lower casing 52 is inserted into the core 51. The ink ribbon 1 is fed through rollers 53*b*, 53*c*, and 53*d* which are rotatably attached to a projecting portion 52*b* of the lower casing 52, an ink ribbon detecting window portion 52*c*, and a projecting portion 52*d* of the cassette lower casing, respectively. The ink ribbon 1 is once exposed to the outside of the casing C in an opening portion 52*e* of the lower casing. Then, the ink ribbon is guided by the peeling roller 54 and thereafter, it again enters the casing C from an opening portion 52*l* and is rewound around the take-up hub 55.

When the cassette 50 is set at a predetermined position on the table 28, the opening portion 52*e* is located so as to face the head 25 on the main body side. The ink ribbon exposed to the outside of the cassette casing C can be heated by the thermal head 25 which generates the heat in correspondence to the recording information. Further, the ink ribbon 1 is pressed to the roller 53*b* by a pressure contact spring 56 attached to the lower casing 52. A piece of felt 56*a* is adhered to the spring 56, thereby preventing a damage of the ink ribbon 1 due to the pressure contact thereof.

On the other hand, a tension spring 57 presses the ink ribbon 1 in the direction of an arrow J to thereby pull in a slack of the ink ribbon 1. Namely, the tension spring 57 is attached to the lower casing 52 and elastically presses the ink ribbon 1 on the upstream side (with respect to the rewinding direction of the ink ribbon 1) of the rollers 53*c* and 53*d*. Therefore, when the conveying path of the ink ribbon 1 changes because of the deviation of the peeling roller 54 due to the movement of a peeling lever 58, which will be explained hereinafter, even if the ribbon 1 slacks, the slack can be soon absorbed by the elastic force of the tension spring, so that the slack state of the ribbon 1 can be prevented. A piece of felt 57*a* is also adhered to the tension spring 57 on the contact surface with the ink ribbon 1, thereby preventing damage of the ink ribbon 1. In place of the felt, a soft material or the like may be also coated onto the surface of the tension spring 57.

Further, the peeling lever 58 is attached so as to be slidable along a side edge portion 50*a* of the cassette 50 on the side where the opening portion 52*e* is formed (i.e., in the directions indicated by arrows $C_1$ and $C_2$). Namely, the rear side of the lever 58 is guided by an edge portion 63*a* and a guide 63*b* of the upper casing 63 and by an edge portion (not shown) and a guide (not shown) of the lower casing 52. The front side of the lever 58 is guided by the lower bending portion 63*b* of the upper casing 63 and by the upper bending portion 52*b* of the lower casing 52. Thus, the lever 58 is movable by those guide means. The peeling roller 54 is attached to the edge of the lever 58 so as to be rotatable around a shaft 54*a*. Further, an upper opening 58*a* and a lower opening 58*b* are formed in the lever 58. A lower casing projecting portion 52*f* is inserted into the upper opening 58*a*. A return spring 59 is attached along a guide rod 58*c* between the projecting portion 52*f* and the lever 58. Thus, the lever 58 is downwardly pressed (in the direction of the arrow $C_2$) by the elastic force of the spring 59. Further, a slider 60 is attached to the lower opening 58*b*. The slider 60 is slidable along a guide 58*d* with respect to the lever 58. Further, in the lower opening 58*b*, a pressure contact spring 61 is attached between the lever 58 and the slider 60 along a guide rod 58*e* fixed to the lever 58 and a guide rod 58*f* fixed to the slider 60. The slider 60 is always downwardly pressed (in the direction of the arrow $C_2$) and stopped in contact relation with a stopper portion 58*g* of the guide 58*d*.

A front edge 62*a* of the change-over lever 62 come into engagement with a lower edge 60*a* of the slider 60. In this state, the lever 62 is slidably (in the directions of arrow K) and rotatably (in the directions of an arrow L) arranged between the lower casing 52 and the upper casing 63. A bending change-over portion 62*b* is provided at the rear edge of the lever 62. When the change-over portion 62*b* is come into contact with the projecting portions 27*a* and 27*b* on the main body side, the lever 62 slides in the lateral direction (indicated by the arrows K). The moving range of the lever 62 is restricted by the left and right ends of the opening 52*c*. The lever 62 is rotated around a projecting portion 62*c*, as a rotational center, of the lever 62. The projecting portion 62*c* comes into engagement with lower casing 52 and an elongated opening 63*c* formed in the upper casing 63.

A convex portion 62*d* is formed on the front edge side of the lever 62, thereby preventing the lever 62 from careless lateral moves. However, the convex portion 62*d* has slant surfaces 62*d*, so as not to obstruct the lateral movement of the lever 62 when the change-over portion 62*b* is come into contact with the projecting portions 27*a* and 27*b* on the main body side. Therefore, when the lever 62 moves, the convex portion 62*d* can get over a roller 52*k* by a slight force.

Consequently, in the cassette 50, when the change-over portion 62*b* comes into contact with the projecting portion 27*b* on the main body side and the lever 62 moves to the left and its front edge 62*a* is projected from the edge portion 50*a* on the cassette side, the front edge 62*a* is led to the position to be able to contact the engaging portion 30*b* on the main body side. As mentioned above, when the coupling lever 30 is moved to the side of the platen 10 by the rotation of the motor $M_3$, the engaging portion 30*b* comes into engagement with the front edge 62*a* and the lever 62 is pushed toward the platen 10. Then, the lever 62 presses the lever 58 toward the platen 10 (in the direction of the arrow $C_1$) against the pressing force of the return spring 59. Further, after the lever 58 has come into contact with the platen 10 through the ink ribbon 1 and recording paper 12, the slider 60 is pressed toward the platen 10 (in the direction of the arrow $C_1$) against the pressing force of the spring 61. The lever 58 presses the platen 10 by the pressing force of the spring 61. In this state, the lever 58 is stopped.

Thus, after the ink ribbon 1 was heated, the recording paper 12 and ink ribbon 1 are not peeled off but run in the contact state until the position of the peeling roller 54. After the recording paper 12 and ink ribbon 1 passed through the peeling roller 54, they are peeled off.

As described above, according to the embodiment, the change-over lever 62 is constituted in a manner such that the peeling roller 54 lightly presses the platen 10 through the elastic force of the spring 61. Therefore, the peeling roller 54 comes into contact with the platen 10 when a stable force based on the elastic force is applied. Thus, it is also possible to prevent soiling of a recording image due to the offset, a defective supply such as wrinkles, oblique run, or the like of the ink ribbon, and the like.

On the contrary, when the change-over portion 62*b* comes into contact with the projecting portion 27*a* on the main body side and the lever 62 moves to the right and its front edge 62*a* enters the edge portion 50*a* on the cassette side, even if the coupling lever 30 on the main body side is moved to the side of the platen 10, the lever 62 is not pressed but is held in the direction away from the platen 10 owing to the pressing force of the return spring 59. Therefore, the peeling roller 54 is held at the position apart from the platen 10. After the recording paper and the heated ink ribbon 1 passed through the edge portion of the thermal head 25, they are soon peeled off.

Figure 13:
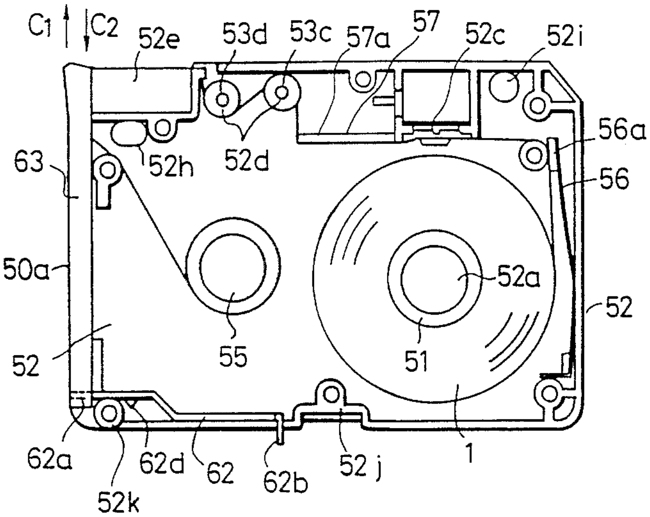
FIG. 13 is an external perspective view showing another embodiment of a two-color ribbon cassette.

Another embodiment of an ink ribbon cassette is shown in FIG. 13. In this embodiment, an integrated abutting lever 63 is used in place of the foregoing peeling lever 58, peeling roller 54, return spring 59, slider 60, and pressure contact spring 61.

In this embodiment, the abutting lever 63 is guided by the lower casing 52 and upper casing (not shown) of the cassette 50 so as to be movable in the directions of the arrows $C_1$ and $C_2$. The abutting lever 63 is come into engagement with the change-over lever 62 and is moved in the directions of the arrows $C_1$ and $C_2$ by the motion of the lever 62.

Therefore, in the foregoing cassette, when the change-over portion 62*b* comes into contact with the projecting portion 27*b* on the main body side an the lever 62 moves to the left and its front edge 62*a* is projected from the edge portion 50*a* on the cassette side, the front edge 62*a* is led to the position to main body side. Accordingly, when the coupling lever 30 is moved to the side of the platen 10 by the rotation of the motor $M_3$ as mentioned above, the engaging portion 30*b* comes into engagement with the front edge 62*a* and the lever 62 is pressed toward the platen 10. Then, the thermal head 25 presses the abutting lever 63 from the lever 62 to the position which is substantially the same as the position corresponding to the platen 10. The abutting lever 63 is stopped at the position near the platen 10 or at the contact position therewith.

Thus, the recording paper 12 and heated ink ribbon 1 are not peeled off but run in the contact relation until the position of the peeling roller 54. After the recording paper and ink ribbon passed through the peeling roller 54, they are peeled off.

On the contrary, when the change-over portion 62*b* is come into contact with the projecting portion 27*a* on the main body side and the lever 62 moves to the right and its front edge 62*a* enters the edge portion on the cassette side, even if the coupling lever 30 on the main body side is moved toward the platen 10, the lever 62 is not pressed but is held at the position away from the platen 10. Therefore, the abutting lever 63 is held at the position apart from the platen 10. After the recording paper and heated ink ribbon 1 passed through the edge portion of the thermal head 25, they are soon peeled off.

The switching operation of colors of recording images in the embodiment will now be explained. Although an example of red and black recording images will be explained in this embodiment, the invention is not limited to this example.

FIGS. 14 to 17 are plan views showing the operation for the two-color recording and illustrate the recordable state in which the ink ribbon cassette 50 is set onto the carrier table 28.

An example in which the recording images of two colors of red and black are selectively formed by use of the ink ribbon cassette 50 in accordance with the color information will be explained hereinbelow.

The case of performing the recording in red is first shown.

Figure 14:
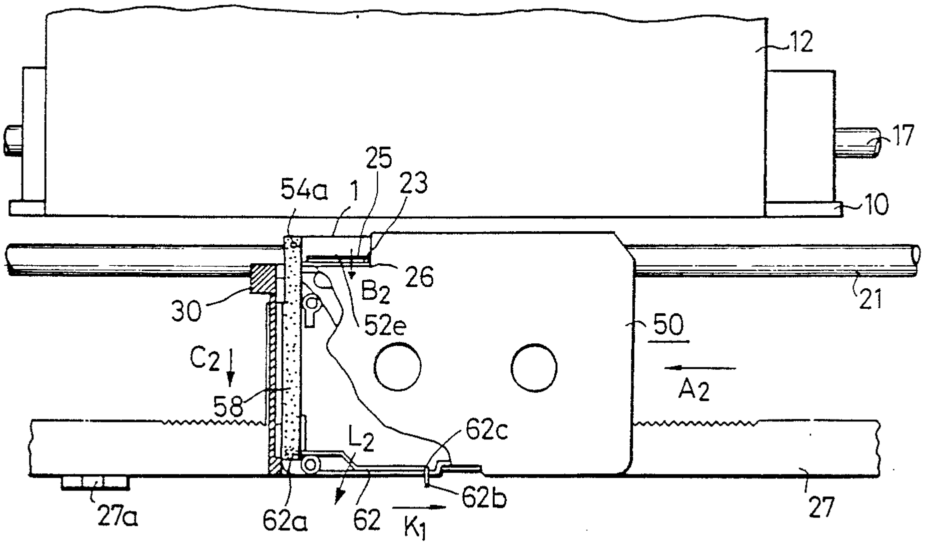
FIGS. 14 to 17 are plan views showing the color change-over operation.
Figure 15:
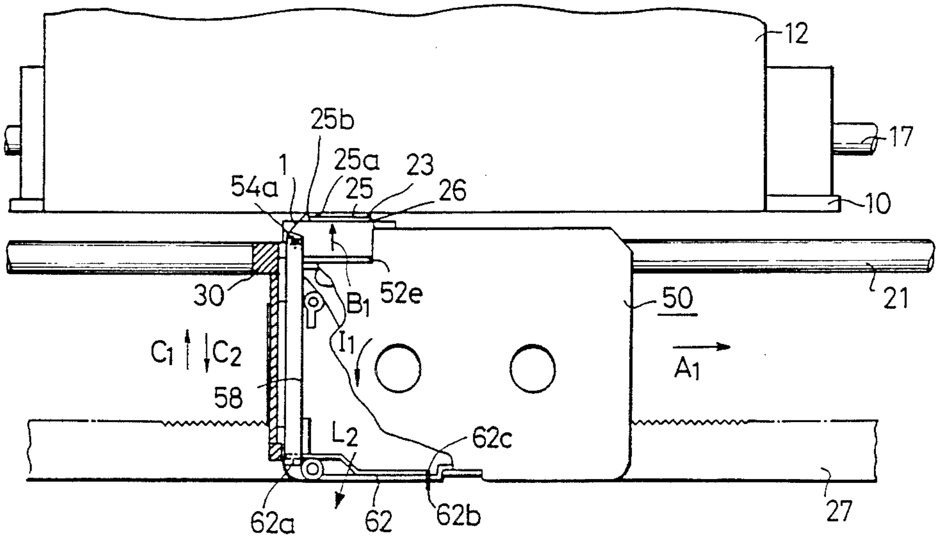

FIGS. 14 and 15 are diagrams showing the case of recording an image using the second ink layer 3*b* (red) of the two-color ink ribbon 1. FIG. 14 shows the color switching operation of the cassette.

When the red recording information is first received by a method, which will be explained hereinafter, the up/down motor $M_3$ (FIG. 8) rotates counterclockwise and the thermal head 25 is moved to the direction of the arrow $B_2$, thereby removing the head 25 from the platen 10 as previously explained. The coupling lever 30 is moved in the direction of the arrow $C_2$. Next, the carrier motor $M_2$ (FIG. 5) is driven to move the carrier 22 (FIG. 8) to the left (in the direction of the arrow $A_2$). The change-over portion 62*b* provided for the change-over lever 62 comes into contact with the projecting portion 27*a* of the rack 27, thereby moving the lever 62 to the right (in the direction of an arrow $K_1$ in FIG. 14). When the lever 62 moves in the direction of the arrow $K_1$, the front edge 62*a* of the lever 62 disengages from the coupling lever 30. On the other hand, the peeling lever 58 is downwardly pressed (in the direction of the arrow $C_2$) and the lever 62 is pressed counterclockwise (in the direction of an arrow $L_2$) by the pressing force of the return spring 59, respectively. The peeling roller 54 is sufficiently away from the platen 10.

FIG. 15 is a diagram showing the state in which the recording is performed using the second ink layer 3*b* (e.g., red) of the two-color ink ribbon 1. In the state described with reference to FIGS. 14 and 15, the up/-down motor $M_3$ (FIG. 8) is rotated clockwise, the thermal head 25 is rotated toward the platen 10 (in the direction of the arrow $B_1$), and the head 25 is pressed to the platen 10 through the recording paper 12 and two-color ink ribbon 1. In this case, the coupling lever 30 moves toward the platen 10 (in the direction of the arrow $C_1$) due to the movement of the heat sink 26 in the direction of the arrow $B_1$. However, the peeling lever 58 is pressed downwardly (in the direction of the arrow $C_2$) and the lever 62 is pressed counterclockwise (in the direction of the arrow $L_2$) by the return spring 59 as previously mentioned, respectively. The peeling lever 58 is sufficiently away from the recording paper 12. Therefore, the carrier 22 is moved to the right recording direction (indicated by the arrow $A_1$) and a heat generating portion 25*a* of the thermal head 25 is made operative in accordance with the recording information to thereby heat the two-color ink ribbon 1. The second ink layer 3*b* is transferred onto the recording paper 12, thereby forming a red image onto the recording paper 12. After the heating, the moving direction of the ink ribbon 1 is soon changed from an edge portion **25*b* of the thermal head 25 by the rewinding force due to the rotation in the direction of the arrow $I_1$ of the take-up clutch 41, so that the ink ribbon is peeled off from the recording paper 12. Thereafter, the ink ribbon 1 is rewound by the take-up core 55**.

The case of performing the recording in black will now be shown.

Figure 16:
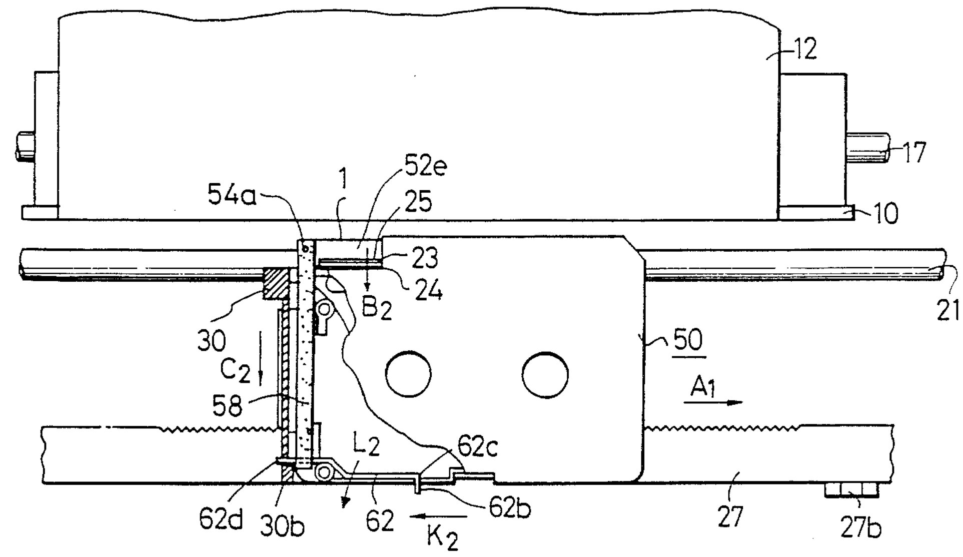
Figure 17:
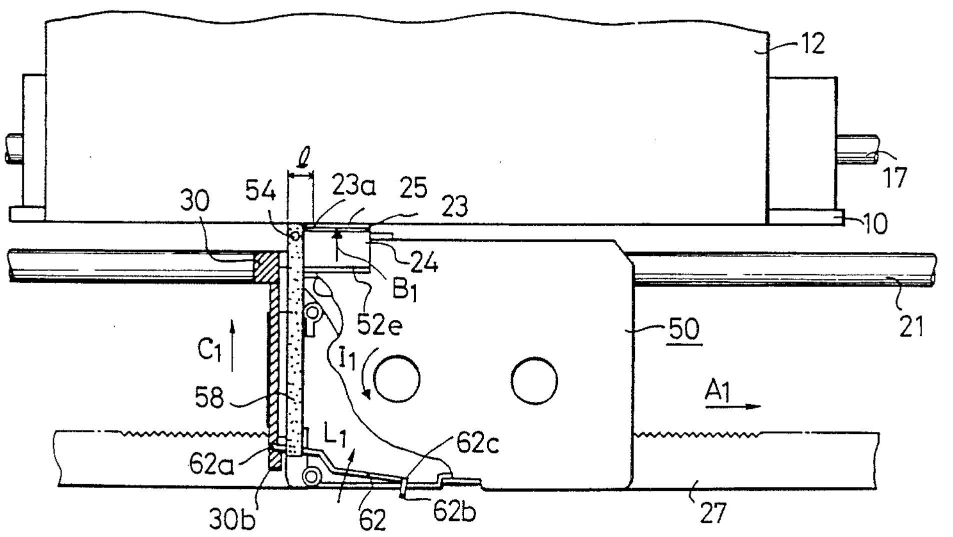

FIGS. 16 and 17 are diagrams showing the case of recording images using both the first ink layer 3*a* and the second ink layer 3*b* of the two-color ink ribbon 1. FIG. 16 shows the color switching operation of the cassette.

When the black recording information is first received by a method, which will be explained hereinafter, the up/down motor $M_3$ (FIG. 8) is rotated counterclockwise, the thermal head 25 is moved in the direction of the arrow $B_2$, thereby removing the head 25 from the platen 10 as previously explained. The coupling lever 30 is moved in the direction of the arrow $C_2$. Next, the carrier motor $M_2$ (FIG. 5) is rotated to move the carrier 22 (FIG. 8) to the right (in the direction of the arrow $A_1$). The change-over portion **62*b* of the lever 62 comes into contact with the projecting portion 27*b* of the rack 27, thereby moving the lever 62 to the left (in the direction of the arrow $K_2$). The front edge 62*a* of the lever 62 comes into engagement with the coupling lever 30 by the movement of the lever 62 in the direction of the arrow $K_2$. On the other hand, the peeling lever 58 is pressed downwardly (in the direction of the arrow $C_2$) and the lever 62 is pressed counterclockwise (in the direction of the arrow $L_2$) by the pressing force of the return spring 59, respectively. The peeling lever 58 is away from the recording paper 12**.

FIG. 16 is a diagram showing the state in which both the first ink layer 3*a* (black) and the second ink layer 3*b* of the two-color ink ribbon 1 are transferred onto the recording paper 12 to thereby perform the recording in black. In the state described with reference to FIG. 15, the up/down motor $M_3$ (FIG. 8) is rotated clockwise, the thermal head 25 is rotated toward the platen 10 (in the direction of the arrow $B_1$), thereby allowing the head 25 to be pressed to the platen 10 through the recording paper 12 and two-color ink ribbon 1. In this case, the coupling lever 30 moves toward the platen 10 (in the direction of the arrow $C_1$) by the movement of the heat sink 26 in the direction of the arrow $B_1$. When the coupling lever 30 moves in the direction of the arrow $C_1$, the engaging portion **30*b* of the lever 30 upwardly presses the front edge 62*a* of the lever 62, thereby rotating the lever 62 clockwise (in the direction of the arrow $L_1$) again the spring force of the return spring 59. The peeling lever 58 moves upwardly (in the direction of the arrow $C_1$) by the rotation of the lever 62 in the direction of the arrow $L_1$ and comes into contact with the recording paper 12 through the ribbon 1. The coupling lever 30 further moves in the direction of the arrow $C_1$, thereby rotating the change-over lever 62 in the direction of the arrow $L_1$. When the lever 62 further rotates in the direction of the arrow $L_1$, the slider 60 is moved in the direction of the arrow $C_1$ against the spring forces of the return spring 59 and pressure contact spring 61. The peeling roller 54 of the peeling lever 58 is allowed to approach or come into pressure contact with the recording paper 12 through the ink ribbon 1 by the reaction force of the spring 61**.

In this state, the carrier 22 is moved to the right recording direction (indicated by the arrow $A_1$) and the heat generating portion **25*a* of the thermal head 25 is made operative in accordance with the recording information. The two-color ink ribbon 1 is heated. Thereafter, the moving direction of the ink ribbon is changed by the rewinding force due to the rotation in the direction of the arrow $I_1$ of the take-up clutch 41 at the position of the peeling roller 54 of the peeling lever 58 which is away from the heat generating portion 25*a* by the distance l, so that the ink ribbon is peeled off from the recording paper 12**. The first ink layer 3*a* is transferred to the recording paper 12 together with the second ink layer 3*b*, thereby forming a black image onto the recording paper 12. Thereafter, the ink ribbon 1 is rewound by the take-up core 55.

Figure 18A:
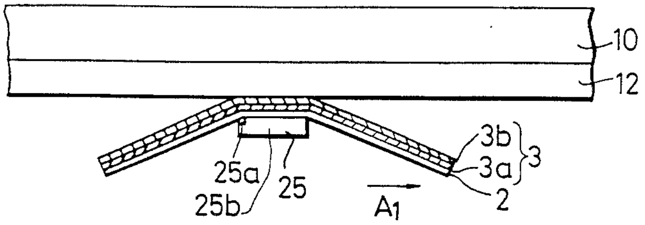
FIGS. 18A, 18B, 19A and 19B are enlarged diagrammatical views of a recording section in an apparatus according to the embodiment.
Figure 18B:
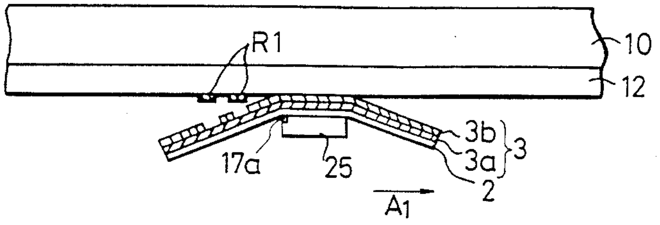
Figure 19A:
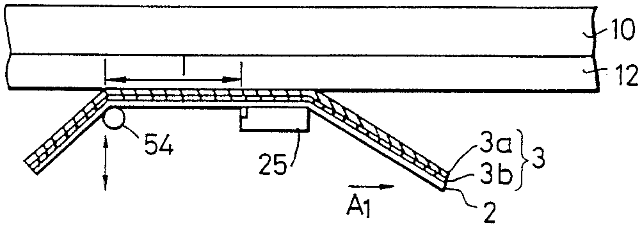
Figure 19B:
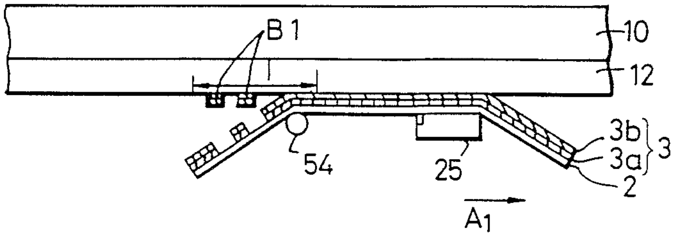

Next, the foregoing respective image recording states of red and black will be explained with reference to enlarged diagrammatical views. FIGS. 18A and 18B are enlarged diagrammatical views showing the case of the image recording of red. FIGS. 19A and 19B are enlarged diagrammatical views showing the case of the image recording of black.

FIGS. 18A and 18B are diagrams showing the image recording using the second ink layer (e.g., red).

In the diagrams, the thermal head 25 is pressed onto the platen 10 through the two-color ink ribbon 1 and recording paper 12. While the thermal head 25 is run in the direction of the arrow $A_1$, the heat generating portion **25*a* (consisting of, e.g., a plurality of heat generating elements) of the thermal head 25 is made operative in accordance with the recording information, thereby heating the two-color ink ribbon 1**. The second ink layer 3*b* (e.g., red) of the ink ribbon 1 is adhered onto the recording paper 12 by the heat generation.

Next, the head 25 is moved in the direction of the arrow $A_1$ and the moving direction of the ink ribbon 1 is changed at the edge portion **25*b* of the head 25. The ink ribbon 1 is pulled by the rewinding force at an early time $t_1$ after the heat generation, i.e., before the heated ink ribbon 1 is cooled (refer to the characteristic diagram of the two-color ink ribbon shown in FIG. 3A), thereby peeling off the ribbon from the recording paper 12**.

As shown in FIG. 3A, there is the following relation between the adhesive forces among the support member 2, the first ink layer 3*a*, and the second ink layer 3*b* of the two-color ink ribbon 1 when the ribbon is peeled off. Namely, the adhesive force between the support member 2 and the first ink layer 3*a* is larger than that between the first ink layer 3*a* and the second ink layer 3*b*. On the other hand, the adhesive force between the second ink layer 3*b* and the recording paper 12 is large because of the heating by the thermal head 25. Thus, the ink layer 3 is separated in the portion having the weakest adhesive force between the first and second ink layers 3*a* and 3*b*. Only the second ink layer 3*b* (e.g., red) is transferred to the recording paper 12, so that a red image recording RI is obtained.

On the other hand, the recording of a black image is executed in the following manner.

FIGS. 19A and 19B are diagrams showing the recording using the first and second ink layers 3*a* and 3*b*.

Similarly to the above, the thermal head 25 is pressed onto the platen 10 through the two-color ink ribbon 1 and recording paper 12. While the head 25 is run in the direction of the arrow $A_1$, the heat generating portion 25*a* of the thermal head 25 is made operative in accordance with the image information, thereby heating the ink ribbon 1. The second ink layer 3*b* of the ink ribbon 1 is adhered onto the recording paper 12 by the heat generation. The ribbon 1 comes into contact with the recording paper 12 by the peeling roller 54 at the point which is away from the heat generating portion 25*a* of the thermal head 25 by only the distance l (FIG. 19 A) in the direction opposite to the arrow $A_1$. Next, the ink ribbon 1 is moved in the direction of the arrow $A_1$ with the distance l held between the thermal head 25 and the peeling roller 54. At the position of the peeling roller 54, the moving direction of the ink ribbon 1 is changed at the slow time $t_2$ after completion of the heating of the ink ribbon 1, namely, after the heated ink ribbon 1 was cooled (refer to the characteristic diagram of the two-color ink ribbon shown in FIG. 3A). In this way, the ribbon is pulled by the rewinding force and peeled off from the recording paper 12. The time $t_2$ can be determined by the moving velocity of the thermal head 25 and the distance l.

As shown in FIG. 3A, there is the following relation between the adhesive forces among the support member 2, the first ink layer 3*a*, and the second ink layer 3*b* of the ink ribbon 1 when the ribbon is peeled. Namely, the adhesive force between the support member 2 and the first ink layer 3*a* is smaller than that between the first and second ink layers 3*a* and 3*b*. The adhesive force between the second ink layer 3*b* and the recording paper 12 is large because of the heat generation by the thermal head 25. Thus, the ink layer 3 is separated in the portion having the weakest adhesive force between the support member 2 and the first ink layer 3*a*. Both of the first and second ink layers 3*a* and 3*b* are transferred to the recording paper 12, so that a black image recording BI is obtained.

With the apparatus of the embodiment explained above, both of the transfer of only the second ink layer 3*b* and the synthetic transfer of the first and second ink layers 3*a* and 3*b* can be performed and the two-color image recording can be executed. The two-color image recording can be accomplished by controlling the peeling of the ink ribbon immediately after the heating at the edge portion of the thermal head, the movement (over run) of the distance l after the heat generation by the thermal head, and the peeling of the ink ribbon in the pressure contact roller portion which is away from the thermal head by the distance l.

(Constitutional block diagram)

Figure 20:
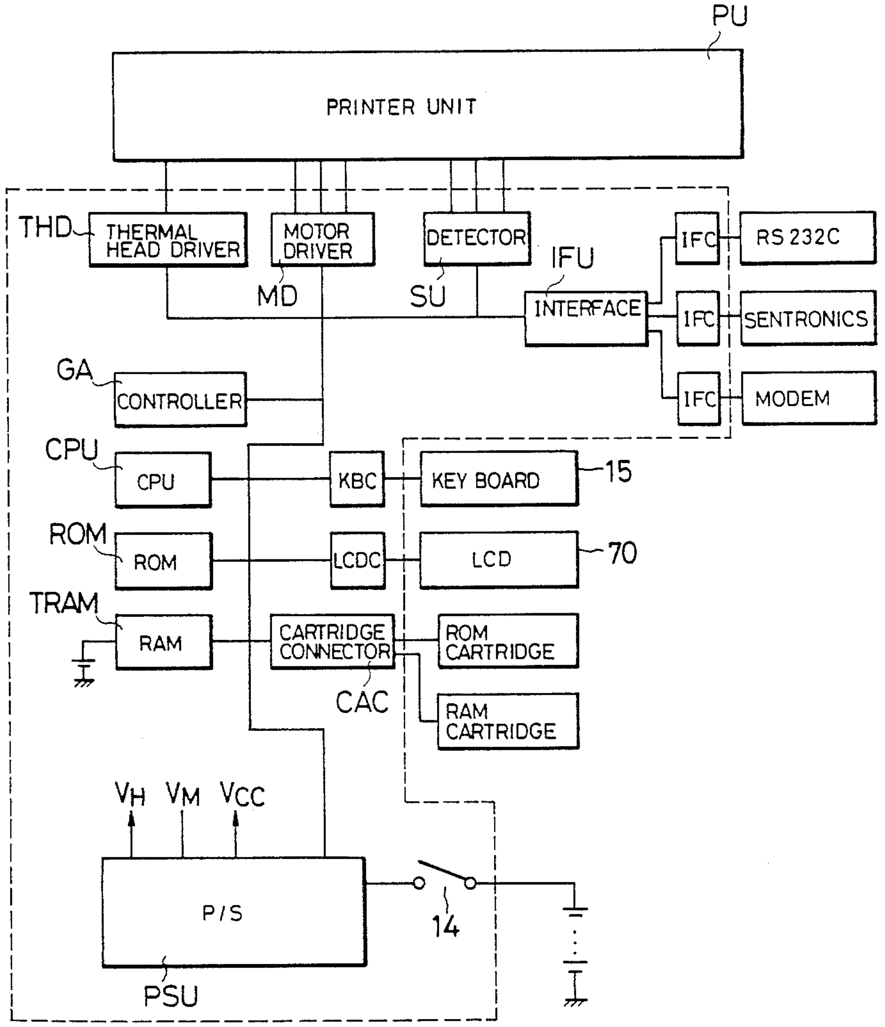
FIG. 20 is a schematic block diagram of an output apparatus.

FIG. 20 shows a schematic block diagram of the foregoing output apparatus.

In this diagram, only the connecting relation of each block is illustrated and the detailed control lines are omitted. The portion surrounded by a broken line indicates a central processing unit CPU.

The CPU reads out a program and various kinds of data from a ROM or the like, which will be explained hereinafter, and performs the necessary arithmetic operations, decisions, and various kinds of controls The CPU may be also constituted by a plurality of units. A ROM is a read only memory. Various kinds of programs by which the CPU operates, character codes, dot patterns (character generator, CG), and various data which are necessary for printing and the like are stored in the ROM. TRAM denotes a read/write memory having: a working area to temporarily store the data during the execution of a command by the CPU and the results of the arithmetic operations; a buffer area to store various data which are input from the keyboard 15 and an external interface section IFU (which will be explained hereinafter); a text area to keep document data; and the like. Since the TRAM is backed up by a battery, the data stored in the TRAM can be kept even if the power supply on the main body side is disconnected by turning off the power switch 14.

The CPU is connected to a printer unit PU through a thermal head driver THD, a motor driver MD, and a detector SU.

The thermal head driver THD is provided in the printer unit PU under the control of the CPU. Under the control of the CPU, the thermal head 25 is driven and the motor driver MD drives the paper feed motor $M_1$, carrier motor $M_2$, and up/down motor $M_3$.

The detector SU transfers the detection data of the limit sensor 23*a* and the sensor 29 which are provided for the printer unit PU to the CPU.

A power source unit PSU supplies a power source VH to drive the thermal head 25 a power source VM to drive the paper feed motor $M_1$, carrier motor $M_2$, and up/down motor $M_3$, and a power source Vcc for other logic circuit.

On the other hand, a controller GA can change, depending on the type of character to be printed or the particular kind of recording paper used, the voltage and current of the power source VH to drive the thermal head 25 thus changing the heating time and duty of the head 25. Controller GA also performs various controls under the control of the CPU.

The keyboard 15 is connected to the CPU through a keyboard connector KBC in order to input various data which are necessary for printing, editing, and the like.

A liquid crystal display section (LCD) 70 is connected to the CPU through an LCD connector LCDC in order to display the data input from the keyboard 15 and other various information.

Other display apparatus such as CRT or the like may be used in place of the LCD 70.

An interface such as RS232C, centro interface, modem, or the like can be also connected to the CPU through an interface connector IFC in order to control the recording apparatus by an external controller and to communicate with an external apparatus.

In addition, a ROM cartridge to perform the operation of a special function and the printing by other character style and a RAM cartridge as an extension memory to keep the document, data, or the like can be also connected to the CPU through a cartridge connector CAC.

Although not shown in FIG. 20, an audio output apparatus such as a buzzer or the like may be also further provided.

(Power-ON sequence)

Figure 21:
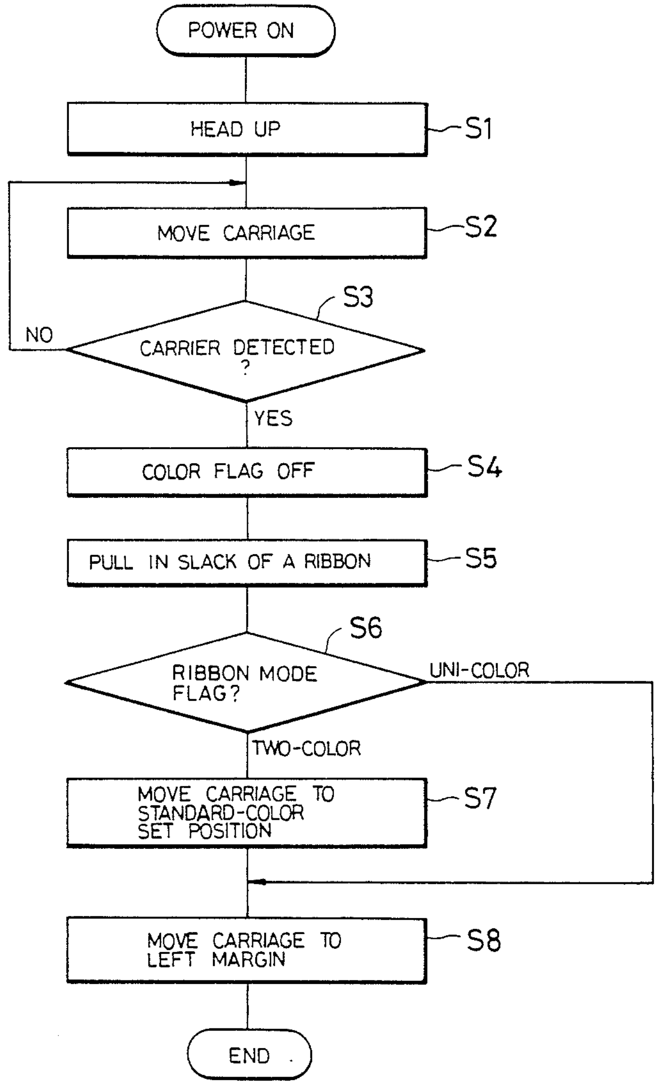
FIG. 21 is a flowchart showing a power-ON sequence of an output apparatus.

The control of the output apparatus based on the program stored in the foregoing ROM will now be explained. FIG. 21 is a control flowchart for a power-ON sequence of the output apparatus to which the present invention is applied. As explained above, the output apparatus has a thermal printer capable of performing the two-color printing. A ribbon for the unicolor printing or a two-color ribbon which can perform the two-color printing by a single ribbon can be set to the output apparatus. In addition, in the case of the two-color ribbon, the colors can be switched.

In the invention, a ribbon identification signal or a color designation signal which is input from a key of the keyboard, or the like can be used as a signal indicative of the color information.

First, when the power source of the apparatus is turned on, the thermal head is lifted up so as to be away from the platen 10 (step S1). The carrier 22 is moved toward the limit sensor 23*a* in order to detect the absolute position of the carriage (step S2).

When the limit sensor 23*a* detects the carrier (step S3), step S4 follows and in the case of the two-color ink ribbon, a color flag (stored in the TRAM) is set to OFF in order to print in the standard color, e.g., black. Namely, the standard color is set into the standard mode at the time of the power-ON. The standard mode may be also displayed. In the next step S5, the slack of the ribbon is pulled in to thereby keep the uniform print quality and this operation will be explained in detail hereinafter. In the next step S6, a ribbon mode flag (stored in the TRAM) is checked to see if the ribbon which has already been set or the ribbon to be set is the (1) uni-color ribbon or twocolor ribbon. The ribbon mode flag may be set by the sensor 29 to determine the kind of ribbon or ribbon cassette or may be set by the key input, voice input, or the like by the operator. When the ribbon mode flag has been set into the uni-color ribbon mode, step S8 follows. When the ribbon mode flag has been set into the two-color ribbon mode, the carriage is moved to the standard-color set position so that the standard color (black) between two colors can be printed (refer to FIGS. 16 and 17) and the ribbon cassette is set into the standard color (step S7). In step S8, the carriage is moved to the left margin $LM_1$ for use in the uni-color ribbon mode in the case of the uni-color ribbon mode, while the carriage is moved to the left margin $LM_2$ for use in the two-color ribbon mode in the case of the two-color ribbon mode. These left margins will be explained in conjunction with FIG. 22. The ribbon mode flag is backed up by the power source even if the power supply of the apparatus is turned off, so that the ribbon mode at the time of the power-OFF is held. The kind of ribbon is discriminated at the time of the power-ON and when it differs from the kind of ribbon at the time of the power-OFF, there is a possibility such that the operator is wrong (i.e., in spite of the fact that the uni-color ribbon has been set, the operator might have misunderstood that the two-color ribbon was set, so that he input the wrong data indicative of the two-color ribbon). In order to prevent such a mistake, the kind of ribbon detected at the time of the power-ON may be also informed by buzzer, message display, or the like before it is input after the power-ON.

Figure 22:
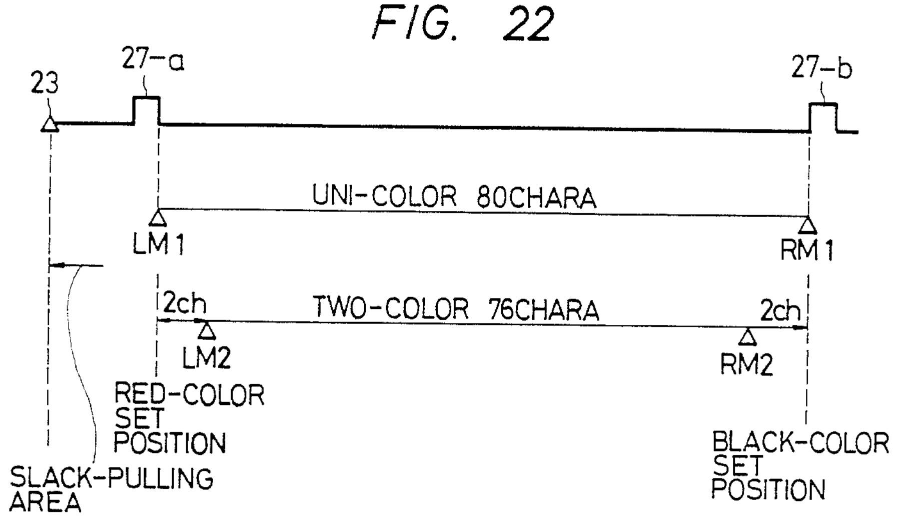
FIG. 22 is a diagram showing an output range responsive to the ribbon.

The margins (moving areas of the carriage) for use in the foregoing uni-color and two-color printing modes will now be explained with reference to FIG. 22. In the diagram, $LM_1$ and $RM_1$ denote the left margin and right margin which indicate the printable area by the uni-color ribbon. In this case, eighty characters can be printed in this embodiment. On the other hand, $LM_2$ and $RM_2$ represent the left and right margins to define the printable area by the two-color ribbon and the foregoing black or red printing can be performed. In this case, 76 characters can be printed. Two characters at the leftmost end denote the color switching area at the red-color set position (position of the projecting portion 27*a*). Two characters at the rightmost end indicate the color switching area at the black-color set position (position of the projecting portion 27*b*). Further, the area from the position of the sensor 23*a* to the actual printable area is the ribbon-slack pulling area (corresponding to the pitch of, e.g., one character). Numerals 27-*a* and 27-*b* denote the projecting portions to change over the ribbon color.

(Key Input Sequence)

Figure 23:
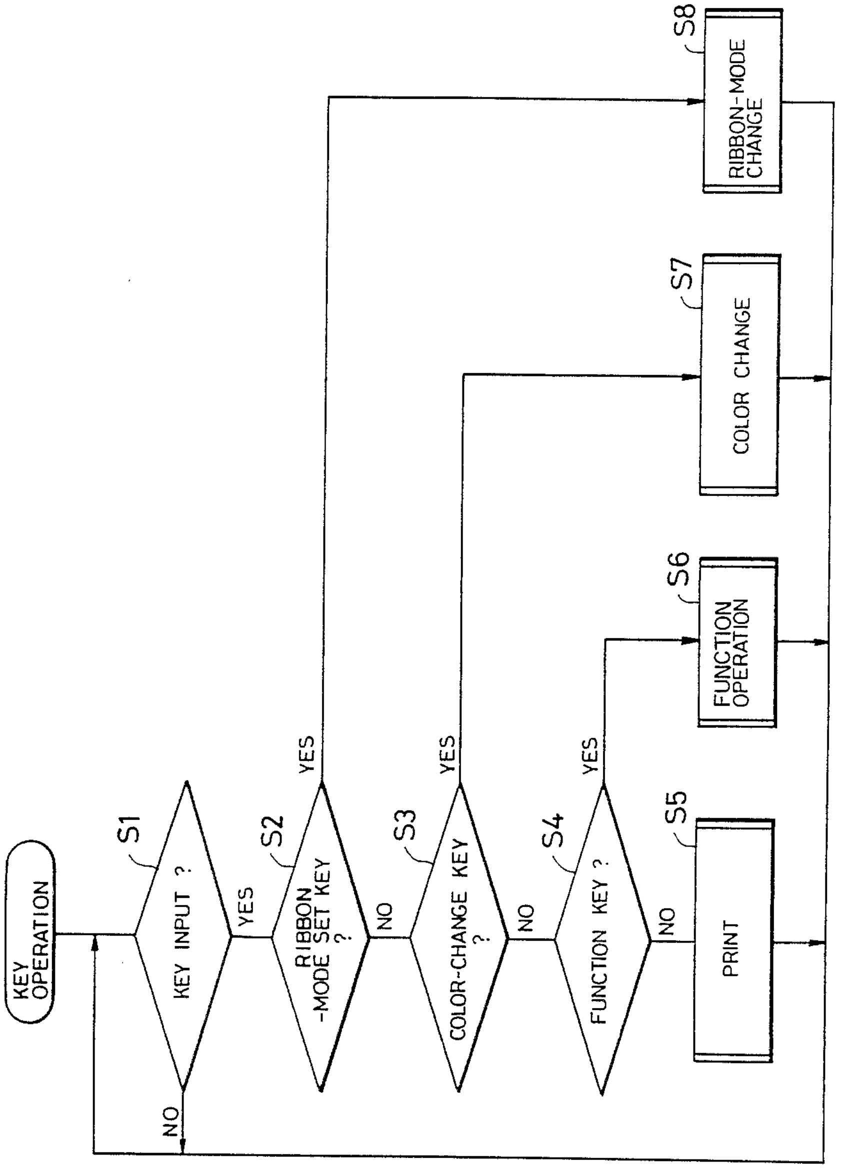
FIG. 23 is a flowchart showing a key operation.

FIG. 23 shows a flowchart to control the key input of the operator. When there is a key input in step S1, a check is made in step S2 to see if a ribbon-mode set key has been pressed or not. If the answer is YES, the processing routine advances to the ribbon-mode change program in step S8. If NO, step S3 follows. A ribbon-mode set key RMKY may be the key operations by, e.g., the mode key MOKY +numeral key [1] in FIG. 4, or the like. In the next step S3, a check is made to see if a color change key CCKY has been pressed or not. If the answer is YES, the color change program in step S7 follows. The color change key CCKY may be the key operations by, e.g., the mode key MOKY+ numeral key [2] in FIG. 4, or the like. The color change key is used to change the color mentioned above. If NO in step S3, step S4 follows to see if a function key such as return key, tab key, centering key, left margin set key, or the like has been set. If such a function key has been pressed, step S6 follows and the processing routine advances the function operation control program.

If NO in step S4, it is determined that the input key is a print key PRKY and the print control program in step S5 follows. After completion of the above operations, processing routine is returned to step S1 and the apparatus waits for another key input. Although the case where data is input by the key input has been described above, the invention can be also applied to the case of a command in text information or a control command from an external controller such as host computer or the like.

(Pull in Slack of Ribbon)

Figure 24:
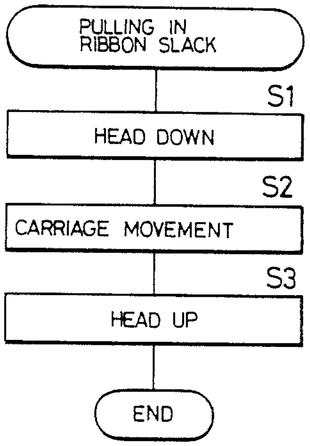
FIG. 24 is a flowchart showing the operation to pull in a slack of the ribbon.

The pulling in slack of the ribbon in step S5 in FIG. 21 will now be explained. FIG. 24 is a control flowchart for pulling in ribbon slack. In step S1, the thermal head 25 is put down, so that the ribbon in the cassette can be rewound (refer to FIGS. 7 to 10). In the next step S2, the carriage is moved by one character in the direction of the arrow $A_1$ without heating the head 25. The thermal head is lifted up in step S3. By executing these operations, the ribbon is suspended with a predetermined tension and the slack of the ribbon is pulled in.

(Ribbon-Mode Change)

Figure 25:
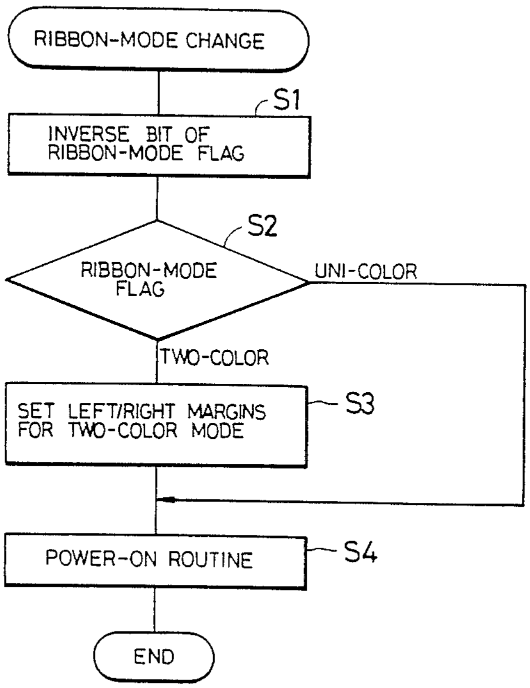
FIG. 25 is a flowchart showing the operation to change the ribbon mode.

The ribbon-mode change shown in step S8 in FIG. 23 will now be explained. When the ribbon-mode set key RMKY is input, the ribbon-mode flag bit stored in the TRAM is first inverted in step S1 in FIG. 25. When the uni-color ribbon mode has already been set, the ribbon-mode flag is set into the two-color ribbon mode. If the two-color ribbon mode has already been set, the ribbon-mode flag is set into the uni-color ribbon mode. A check is then made in step S2 with respect to into which mode the ribbon-mode flag has been set. If it has been set to the uni-color ribbon mode, step S4 follows and the power-ON routine in FIG. 21 is executed. If the two-color ribbon mode has been set in step S2, step S3 follows and the positions of the left margin ($LM_2$) and right margin ($RM_2$) for the two-color printing, which have previously been described in FIG. 22, are stored into the memory (TRAM). (In general, the positions of $LM_1$ and $RM_1$ are set.) Then, the power-ON routine in step S4 is executed. In the power-ON routine, the pulling in the ribbon slack is performed as mentioned above and the carriage is moved to a predetermined left margin ($LM_1$ or $LM_2$) in accordance with the uni-color or two-color ribbon. The carriage may be also moved to a desired margin position which is set by the user. The ribbon mode may be set not only by the key input but also by automatically detecting the carriage position by the sensor 29 in FIG. 5 as previously mentioned above. Thereafter, the routine in FIG. 25 may follow. On the other hand, there is a fear such that the user erroneously inputs the margin position because of the foregoing two kinds of printable areas. However, in such a case, the misinput may be alarmed or the wrong margin position which was erroneously input by the user may be ignored and the carriage may be moved to the position of $LM_1$ or $LM_2$.

(Color Change)

Figure 26:
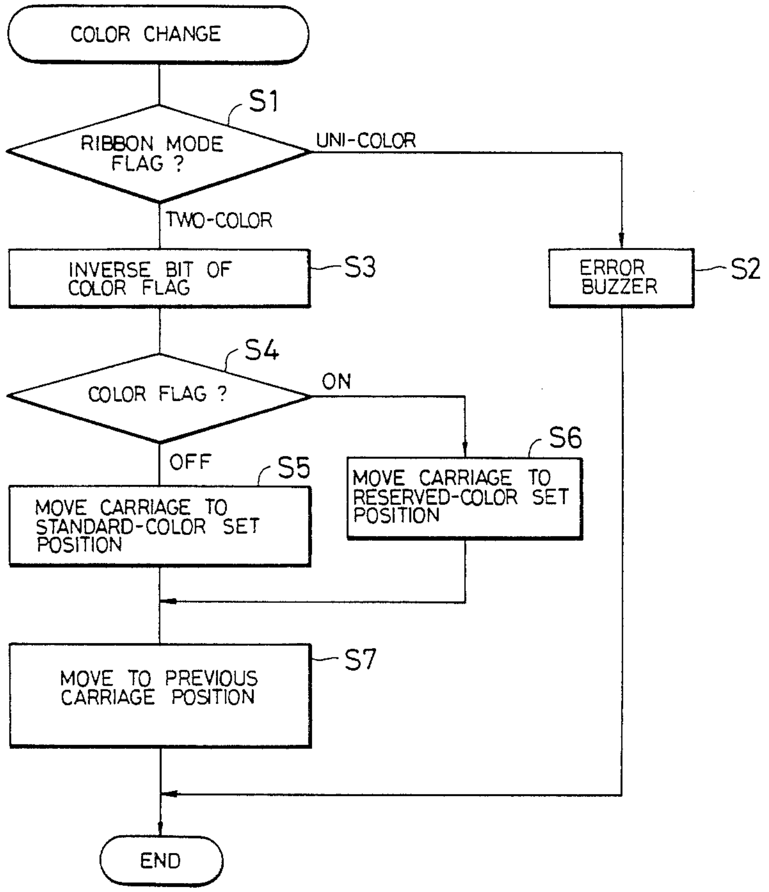
FIG. 26 is a flowchart showing the operation to change a color.

The color change shown in step S7 in FIG. 23 will now be explained. The color change is performed on the assumption of that the two-color ribbon cassette is set on the carrier table. Therefore, in step S1, the ribbon-mode flag is discriminated. If it is decided that the uni-color ribbon cassette has been set, the input color change information is invalid, so that it is warned in step S2 by buzzer, display, voice, or the like. If it is determined in step S1 that the ribbon-mode flag has been set into the two-color ribbon, the color flag bit stored in the TRAM is inverted in step S3 to thereby change the color to be output. Namely, if black (standard color) of the two-color ribbon has been selected, the color flag bit is inverted so as to output red (reserved color). If red has been selected, the color flag bit is inverted so as to output black. The current carriage position is stored into the TRAM. Then, the inverted color flag is checked in step S4. If it is OFF (black), step S5 follows and the carriage (carrier) is moved to the standard-color (black) set position mentioned above. In step S3, the color flag is set to ON (red) and the carriage is moved to the reserved-color (red) set position in step S6. (Refer to FIGS. 16 and 17.) In the next step S7, the carriage is moved to the previous carriage position before the carriage is moved in steps S5 and S6 or to the next printing position. In this explanation, the pulling in ribbon slack is not performed in the color change mode. However, when a color change signal is input, the pulling in ribbon slack may be also executed (e.g., after step S7 in FIG. 26).

(Print Sequence)

The print sequence shown in step S5 in FIG. 23 will now be explained with reference to FIG. 27. The information which is output in the present invention may be any data such as characters, graphics, images, symbols, or combination thereof, or the like. The processing routine advances to step S5 in FIG. 23 in response to the print command key PRKY. However, a print command may be also generated each time one character is input. Or, a print command may be generated on a word unit basis or on a one-line unit basis. The process in step S5 in FIG. 23 may follow in response to the print command. Although the carriage and the like are moved by the motor driver MD and the like shown in FIG. 20, the motors and the like are omitted for simplicity of explanation.

Figure 27:
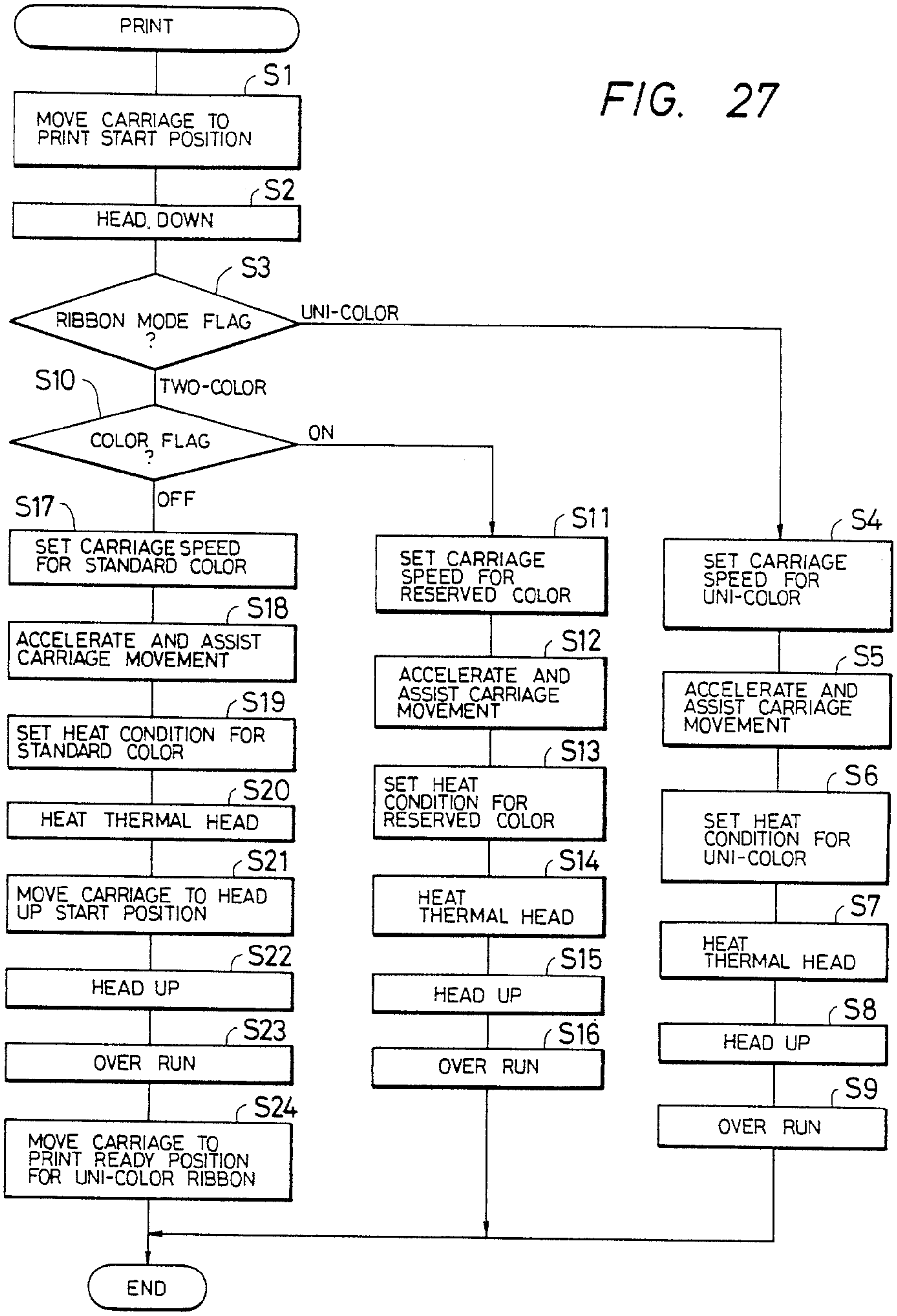
FIG. 27 is a flowchart showing a printing sequence.

In FIG. 27, the carriage is moved to the print start position in step S1. The thermal head 25 is put down in step S2. The ribbon-mode flag is checked in step S3. If the flag has been set to the uni-color ribbon mode, step S4 follows and the carriage speed (in the speed table stored in the ROM) for use in the unicolor mode is set. In step S5, the carriage is accelerated and assisted at the set speed (e.g., 18 characters/sec). In step S6, the heat condition for the uni-color is set. In this case, since the voltage and current are changed, a command is sent to the controller. The heat time for the uni-color is set (for example, the thermal head is heated for 1.1 msec). In step S7, the thermal head 25 is heated for the set period of time based on the above heat condition, thereby printing. The head 25 is lifted up in step S8. In step S9, the carriage is overrun, i.e., it is moved by a constant distance. The printing section can be seen by the overrun of the carriage and at the same time, the index 30*a* can indicate the next printing character. In this way, the processes are finished. The stop position of the carriage corresponds to the print standby position in the case of the uni-color ribbon.

If it is determined that the ribbon-mode flag has been set into the two-color ribbon mode in step S3, the color flag is checked in step S10. If the flag has been set to ON, i.e., it indicates the reserved color (blue, red), the carriage speed (in the speed table stored in the ROM) for the reserved color is set in step S11. In the next step S12, the carriage is accelerated and assisted at the set speed (e.g., 18 characters/sec). The heat condition for the reserved color is set in step S13. The thermal head is heated in step S14 under the heat condition for the reserved color with respect to the voltage, current, and heat time (e.g., 1.1 msec), thereby printing. The head is lifted up in step S15. The carriage is overrun in step S16. The processes are finished in this manner.

Returning to step S10, if the color flag has been set to OFF, i.e., the standard color (black), step S17 follows and the carriage speed for the standard color is set. The carriage is accelerated and assisted at the set speed (e.g., 10 characters/sec) in step S18. The heat condition for the standard color is set in step S19. In step S20, the thermal head is heated (for the period of time of, e.g., 0.8 msec), thereby printing. The reason why the carriage speed and the heat time of the thermal head are changed in the case of the standard color as compared with those in the reserved color is because the standard color needs to be certainly printed. In step S21, in order to change the peeling position of the ribbon, the carrier is put down to the head-up start position and is moved by the distance l (refer to FIG. 28). Thus, the first and second ink layers of the ribbon are transferred and a black image is printed onto the recording paper. In step S22, the head is lifted up. In step S23, the carriage is overrun similarly to the case of the uni-color (reserved color). In the uni-color (reserved color) printing mode, the index indicates the next printing position by the overrun of the carriage (steps S9 and S16). However, in step S24, since the carriage is stopped at the position different from the position in the case of the uni-color ribbon because of step S21, the index does not indicate the next printing character. In order to stop the carriage to the same position as that in the case of the uni-color ribbon, the carriage is returned by the distance corresponding to 64 pulses which was moved in step S21. In this manner, the carriage is moved such that the index 30*a* is located to the next printing position irrespective of the ribbon mode or printing color.

Figure 28:
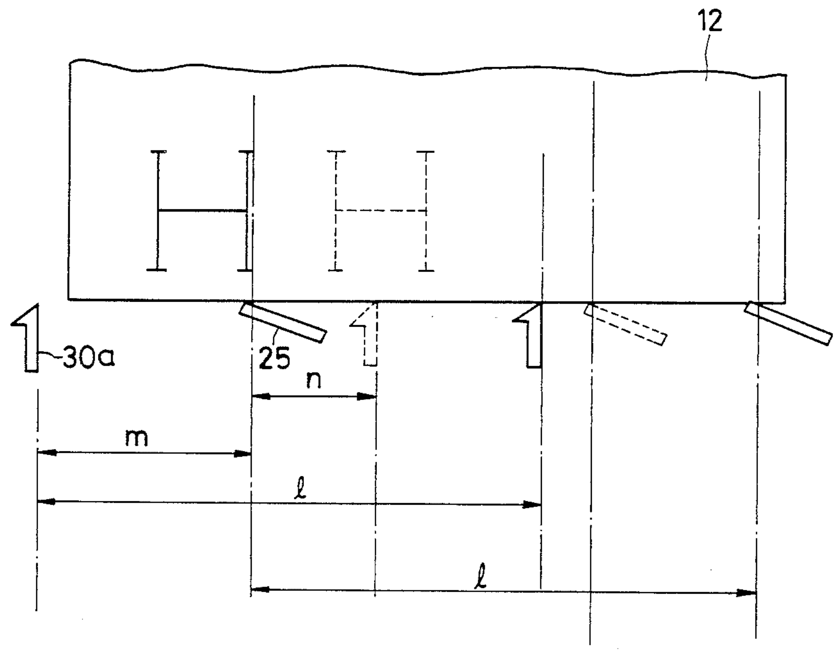
FIG. 28 is a diagram showing the relations among the print position, the head, and the index.

FIG. 28 is a diagram showing the relations among the index 30*a*, the head 25, and the printing characters. It is assumed that H of a solid line indicates the printed character and H of a broken line represents the position of the next character to be printed. The distance m denotes a distance between the index 30*a* and the head 25. The distance m is constant irrespective of the ribbon mode or color (refer to FIG. 5). The index written by a broken line indicates a desired position indicative of the next printing position. An index shown by a solid line represents a position at which the head is lifted up after the printing of the standard color. The distance n denotes a distance between the position of the head 25 at the end of the printing and the central position of the next character to be printed. Therefore, even in the case of the uni-color or two-color ribbon, when the reserved color is printed, the carriage is overrun by only the distance of (m+n) in order to set the index to the next printing position (steps S9 and S16 in FIG. 27). In the case of the standard color printing, as described in step S21 in FIG. 27, the carriage has already been advanced by only the distance of, e.g., l in FIG. 28. The relations among the values of n, m, and l are not limited. In steps S21, S23, and S24 in FIG. 27, the carriage is moved such as $$\frac{S21}{l} + \frac{S23}{n+m} - \frac{S24}{l}.$$

However, as will be obvious from FIG. 28, it is also possible to return the carriage by only the distance of l−(m+n) after it was moved by only the distance l after completion of the printing (in step S21). Although the heat time has been changed in the foregoing embodiment, the voltage can be also changed by controlling the driving power source VH.

Although the embodiment has been described with respect to the example in which the ink ribbon was used, the invention is not limited to the ribbon-shaped ink sheet. As well as the ink ribbon, e.g., a wide tape-shaped ink sheet which is used in a line printer or the like, or other similar ink sheet can be also used as an ink sheet.

On the other hand, in addition to the recording paper mentioned in the foregoing embodiment, for example, a transparent thin plastic plate which is used in an overhead projector (what is called an OHP) or the like can be also properly used as a recording medium.

Further, the heating means is not limited to the thermal head mentioned in the foregoing embodiment but, for example, an infrared rays, a laser beam, or the like can be also properly used as heating means.

On the other hand, although the foregoing embodiment has been described with respect to the example of what is called a serial type such that the thermal head is reciprocated along the recording paper, the invention is not limited to this type. For instance, the invention can be also properly applied to so-called a full-line type such that the heating means such as thermal head or the like is provided with regard to the whole recording width.

Moreover, the foregoing embodiment has been described with respect to the example of the case where the ink ribbon is enclosed in the casing and the detachable ink ribbon cassette is used in the apparatus main body. However, the invention concerned with the recording apparatus is not limited to this case. For example, the ink sheet wound around a reel or roll or the like can be directly set into the apparatus main body.

Further, although the embodiment has been explained with respect to the example of the type in which the ink ribbon cassette is reciprocated, the invention is not limited to this type. For instance, the ink ribbon cassette may be of the still type or the like.

Although the embodiment has been described with respect to the example of the two-color image recording, the invention is not limited to this example but can be also applied to the image recording of three or more colors. The invention can be also applied to the case where the recording image colors of the respective ink layers are the same. In this case, for example, the ink sheet can be used for the double or triple period of time or the like in the uni-color recording mode.

The ink sheet is not limited to that shown in the embodiment but other ink sheet can be also used.

Further, although the peeling timing control means such as peeling roller or the like has been also provided on the cassette side in the foregoing embodiment, the invention is not limited to this case. For example, such means may be also provided on the side of the apparatus main body.

In the embodiment, in addition, the process to cool the heated ink sheet is performed by naturally cooling the ink sheet by delaying the peeling timing thereof. However, the invention is not limited to this method. For example, the ink sheet can be forcedly cooled by making a metal such as, iron, aluminum or the like come into contact with or approach the ink sheet or by blowing the cooled air to the ink sheet from a nozzle.

As described in detail above, the recording can be easily performed in response to the color information according to the invention. Further, the apparatus is miniaturized and the apparatus is set such that the recording of the standard color (e.g., black) can be performed at the time of the exchange of the ink sheet or the power-ON. Therefore, there are effects such that it is less likely to cause the recording of an erroneous color and a misoperation or the like, which sometimes occurs in the apparatus having high functions, can be also prevented.

On the other hand, in the recording apparatus for recording onto a recording medium using an ink sheet having an ink, according to the present invention, it is possible to provide the recording apparatus comprising: heating means for heating the ink sheet to thereby record onto the recording medium; peeling means for peeling off the ink sheet from the recording medium on the basis of the information regarding the recording onto the recording medium after the heating of the ink sheet by the heating means; and control means for controlling the peeling condition of the peeling means on the basis of the information with respect to the recording onto the recording medium, wherein the control means controls the peeling means so as to initialize the peeling means at the time of the exchange of the ink sheet or the power-ON of the apparatus.

As described in detail above, according to the invention, the recording can be easily performed in response to the information (e.g., color information) with respect to the recording, the constitution of the apparatus can be simplified, and the apparatus can be miniaturized.

On the other hand, by changing a relative movement amount between the ink sheet and the heating position in response to the information concerned with the recording, the recording can be certainly executed on the basis of predetermined color information. Further, there is also an effect such that the next recording position can be indicated.

Further, according to the invention, in the recording apparatus for recording onto a recording medium by use of an ink sheet having an ink, it is possible to provide the recording apparatus comprising: heating means for heating the ink sheet to thereby record onto the recording medium; and control means for controlling a relative moving amount for the heating position of the ink sheet by the heating means, wherein the control means further changes the relative moving amount after the heating of the ink sheet by the heating means on the basis of the information concerned with the recording onto the recording medium.

According to the invention, in the recording apparatus for recording onto a recording medium by use of an ink sheet having an ink, it is possible to provide the recording apparatus comprising: heating means for heating the ink sheet to thereby record onto the recording medium; an index portion corresponding to the heating position in order to indicate the next recording position on the recording medium; and control means for controlling a relative moving amount for the heating position of the ink sheet by the heating means, wherein the control means calculates the moving amount to change the peeling condition of the ink sheet and the recording medium on the basis of the information concerned with the recording and further corrects the moving amount to thereby position the index portion to the next recording position.

According to the invention, on the other hand, a slack of an ink sheet is pulled in when the power supply to the apparatus is turned on, when the ink sheet is exchanged, or when the color change-over information is input, so that there is an effect such that the recording can be certainly performed with an extremely high quality.

According to the invention, the recordable area can be set in response to the information regarding the recording and when the ink sheet was switched, the recordable area can be automatically set. Therefore, the recording can be efficiently continued.

As described in detail above, according to the invention, by controlling both the heating energy and the peeling means, the extremely high quality recording can be executed on the basis of the recording information.

On the other hand, according to the invention, in the recording apparatus for recording onto a recording medium by use of an ink sheet having an ink, it is possible to provide a recording apparatus comprising: heating means for heating the ink sheet to thereby record onto the recording medium; first control means for controlling the heating energy of the heating means on the basis of the information regarding the recording; movable peeling means for peeling off the ink sheet from the recording medium; and second control means for controlling the movement of the peeling means on the basis of the recording information.

What we claim is:

1. A recording apparatus for recording on a recording medium by use of an ink sheet, comprising:
   - heating means for heating the ink sheet to record on the recording medium;
   - peeling means for peeling the ink sheet from the recording medium after heating of the ink sheet by said heating means; and
   - control means for controlling a condition of said peeling means on the basis of information relating to the recording on the recording medium,
   - wherein said control means controls said peeling means so as to initialize said peeling means at the time of an exchange of the ink sheet or at power-ON of the apparatus.

2. A recording medium apparatus according to claim 1, wherein said control means initializes said peeling means when the apparatus performs recording of a predetermined color.

3. A recording apparatus for recording on a recording medium by use of an ink sheet, comprising:
   - heating means for heating the ink sheet to recording on the recording medium; and
   - control means for controlling a relative moving amount of the heating position of the ink sheet and said heating means,
   - wherein said control means further changes the relative moving amount after heating of the ink sheet by said heating means on the basis of information relating to the recording on the recording medium.

4. A recording apparatus according to claim 3, wherein said control means changes the moving amount so that the ink sheet can be peeled from the recording medium to perform recording in more than one color.

5. A recording apparatus according to claim 3, wherein the information relating to the recording includes color information.

6. A recording apparatus for recording on a recording medium by use of an ink sheet, comprising:
   - heating means for heating the ink sheet to record on the recording medium;
   - an index portion corresponding to a heating position indicative of the next recording position on the recording medium; and
   - control means for controlling a relative moving amount of the heating position of the ink sheet and said heating means,
   - wherein said control means calculates the moving amount in order to change a peeling condition of the ink sheet and the recording medium on the basis of information relating to the recording and further corrects the moving amount to position said index portion at the next recording position.

7. A recording apparatus according to claim 6, wherein the peeling condition is a distance, a time, or a peeling angle until the ink sheet is peeled off from the recording medium after heating by said heating means.

8. A recording apparatus for recording on a recording medium by use of an ink sheet, comprising:
   - heating means for heating the ink sheet to record on the recording medium; and
   - control means for controlling the relative movement of the heating position of the ink sheet and said heating means,
   - wherein said control means controls at least the speed of the movement on the basis of information relating to the recording so as to effectively peel the ink sheet from the recording medium.

9. A recording apparatus according to claim 8, wherein said control means controls the moving speed so as to change a peeling condition to perform recording of a desired color.

10. A recording apparatus according to claim 8, wherein the information relating to the recording includes color information.

11. A recording apparatus for recording on a recording medium by use of an ink sheet, comprising:
heating means for heating the ink sheet to record on the recording medium;
sheet moving means for rewinding or moving the ink sheet; and
control means for driving said sheet moving means so as to pull in slack of the ink sheet,
wherein said control means drives said sheet moving means to pull in the slack of the sheet in response to power-ON of the apparatus, an exchange of the sheet, or a change of recording color.

12. A recording apparatus according to claim 11, wherein said sheet moving means is a take-up portion for rewinding the ink sheet.

13. A recording apparatus for recording on a recording medium by use of an ink sheet, comprising:
heating means for heating the ink sheet to record on the recording medium, the apparatus being capable of mounting a first ink sheet which can record in one color and a second ink sheet which can record in two or more colors;
determining means for determining which of the first and second ink sheets has been mounted to the apparatus; and
control means for respectively setting first and second recordable areas on the basis of the determination by said determining means, and for controlling the heating position of said heating means so that recording can be performed from a recording start position in the first or second recordable area when the first and second ink sheets are switched.

14. A recording apparatus according to claim 13, wherein said heating means is a thermal recording head including a plurality of heat generating elements which are movable relative to recording medium.

15. A recording apparatus for recording on a recording medium by use of an ink sheet, comprising:
heating means for heating the ink sheet to record on the recording medium;
first control means for controlling the thermal energy of said heating means on the basis of information relating to the recording;
movable peeling means for peeling the ink sheet from said recording medium; and
second control means for controlling the movement of said peeling means on the basis of the recording information.

16. A recording apparatus according to claim 15, wherein the thermal energy includes heating time.

17. A recording apparatus according to claim 15, wherein said second control means controls the period of time after the heating by said heating means until the ink sheet is peeled from the recording medium.

18. A recording apparatus according to claim 15, wherein said first control means controls the heating time of said heating means.

19. A recording apparatus according to claim 15, wherein the recording information includes the heating time.

* * * * *

UNITED STATES PATENT AND TRADEMARK OFFICE
CERTIFICATE OF CORRECTION

PATENT NO. : 4,887,096

DATED : December 12, 1989

INVENTOR(S) : Asakura et al.

It is certified that error appears in the above-identified patent and that said Letters Patent is hereby corrected as shown below: ON THE TITLE PAGE:

[56] REFERENCES CITED

FOREIGN PATENT DOCUMENTS

Change "60-73358 11/1985 Japan." to --60-173358 11/1985 Japan.--

COLUMN 6

Line 17, change "an" to --can--.

COLUMN 7

Line 66, change "comea" to --comes--.

COLUMN 13

Line 48, change "to main" to --to come into contact with the engaging portion 30b on the main--.

COLUMN 17

Line 50, delete "(Constitutional block diagram)".

COLUMN 26

Line 8, change "recording medium apparatus" to --recording apparatus--.

Signed and Sealed this

Thirteenth Day of October, 1992

*Attest:*

DOUGLAS B. COMER

*Attesting Officer* *Acting Commissioner of Patents and Trademarks*